US012626487B2

(12) United States Patent (10) Patent No.: US 12,626,487 B2

Sugerman (45) Date of Patent: May 12, 2026

(54) OBJECT DETECTION BASED ON ATROUS CONVOLUTION AND ADAPTIVE PROCESSING

(71) Applicant: Northrop Grumman Systems Corporation, Falls Church, VA (US)

(72) Inventor: Benjamin Eli Klein Sugerman, Pikesville, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 281 days.

(21) Appl. No.: 18/465,502

(22) Filed: Sep. 12, 2023

(65) Prior Publication Data

US 2025/0086935 A1 Mar. 13, 2025

(51) Int. Cl.
*G06V 10/764* (2022.01)
*G06V 10/77* (2022.01)
*G06V 10/80* (2022.01)

(52) U.S. Cl.
CPC ........ *G06V 10/764* (2022.01); *G06V 10/7715* (2022.01); *G06V 10/80* (2022.01)

(58) Field of Classification Search
None
See application file for complete search history.

(56) References Cited

U.S. PATENT DOCUMENTS 12,387,036 B1 * 8/2025 Elsen ..................... G06V 10/82
2020/0202128 A1 * 6/2020 Liu ......................... H04N 23/61

2020/0410273 A1 * 12/2020 Miao .................... G06V 10/454
2021/0125313 A1 * 4/2021 Bai ....................... G06V 10/806
2021/0370993 A1 12/2021 Qian et al.
2023/0076266 A1 * 3/2023 Ying ...................... G06V 10/40
2023/0363609 A1 * 11/2023 Zhang .................. G05D 1/0246
2025/0022217 A1 * 1/2025 Bajpayee ................ G06T 17/00
2025/0217946 A1 * 7/2025 Singh ..................... G06V 10/44

FOREIGN PATENT DOCUMENTS

EP 3933707 A1 1/2022

OTHER PUBLICATIONS

Park et al., "BAM: Bottleneck Attention Module," 1https://sites. google.com/view/bottleneck-attention-module arXiv:1807. 06514v2 [cs.CV] Jul. 18, 2018 (Year: 2018).*
Guo et al., "A Slimmer Network with Polymorphic and Group Attention Modules for More Efficient Object Detection in Aerial Images", Remote Sens. 2020, vol. 12, 30 pgs.
Guo et al., "Extended Feature Pyramid Network with Adaptive Scale Training Strategy and Anchors for Object Detection in Aerial Images", Remote Sens. 2020, vol. 12, 24 pgs.
Tan et al., "EfficientDet: Scalable and Efficient Object Detection", CVPR, Jul. 2020, 10 pgs.

(Continued)

*Primary Examiner* — Soo Shin
(74) *Attorney, Agent, or Firm* — Dority & Manning, P.A.

(57) ABSTRACT

Systems and methods for object detection can include obtaining one or more images and processing the one or more images with a machine-learned object detection model to generate one or more bounding boxes and one or more object classifications. The object detection model may perform atrous convolution, feature fusion, feature map generation, and prediction based on feature extraction.

19 Claims, 19 Drawing Sheets

(56)     References Cited

OTHER PUBLICATIONS

Zhang, "Assisting the Visually Impaired based on Scene Recognition and Semantic Segmentation", Masters Thesis, Karlsruhe Institute of Technology, Mar. 28, 2021, 93 pgs.

Lin et al., "Depth Estimation and Semantic Segmentation from a Single RGB Image Using a Hybrid Convolutional Neural Network", Sensors 2019, vol. 19, 20 pgs.

Wang et al., "ECA-Net: Efficient Channel Attention for Deep Convolutional Neural Networks," ARXIV (Apr. 7, 2020), Retrieved From Internet: https://arxiv.org/pdf/1910.03151.pdf, 12 pgs.

Pröve, "An Introduction to different Types of Convolutions in Deep Learning," Medium (Jul. 22, 2017), Retrieved From Internet: https://towardsdatascience.com/types-of-convolutions-in-deep-learning-71701339714d, 15 pgs.

Liu et al., "An intriguing failing of convolutional neural networks and the CoordConv solution," ARXIV (Dec. 3, 2018), Retrieved From Internet: https://arxiv.org/pdf/1807.03247.pdf, 26 pgs.

Jia et al., "Lightweight Feature Enhancement Network for Single-Shot Object Detection," MDPI (Feb. 4, 2021), Retrieved From Internet: https://www.mdpi..com/1424-8220/21/4/1066, 15 pgs.

Liu et al. "Receptive Field Block Net for Accurate and Fast Object Detection," ARXIV (Jul. 26, 2018), Retrieved From Internet: https://arxiv.org/pdf/1711.07767.pdf, 16 pgs.

He et al., "Spatial Pyramid Pooling in Deep Convolutional Networks for Visual Recognition," ARXIV (Apr. 23, 2015), Retrieved From Internet: https://arxiv.org/pdf/1406.4729.pdf, 14 pgs.

Bello, "LamdaNetworks: Modeling Long-range Interactions Without Attention," ARXIV (Feb. 17, 2021), Retrieved From Internet: https://arxiv.org/pdf/2102.08602.pdf, 31 pgs.

Ultralytics, "YOLOv5," Pytorch (Nov. 22, 2022), https://pytorch.org/hub/ultralytics_yolov5/, 3 pgs.

* cited by examiner

210

220

212

222

800

1300

1302

OBTAIN IMAGE DATA

1304

PROCESS IMAGE DATA WITH AN OBJECT DETECTION MODEL TO GENERATE ONE OR MORE BOUNDING BOXES AND ONE OR MORE OBJECT CLASSIFICATIONS

1306

PROVIDE THE ONE OR MORE BOUNDING BOXES AND THE ONE OR MORE OBJECT CLASSIFICATIONS AS OUTPUT

1400

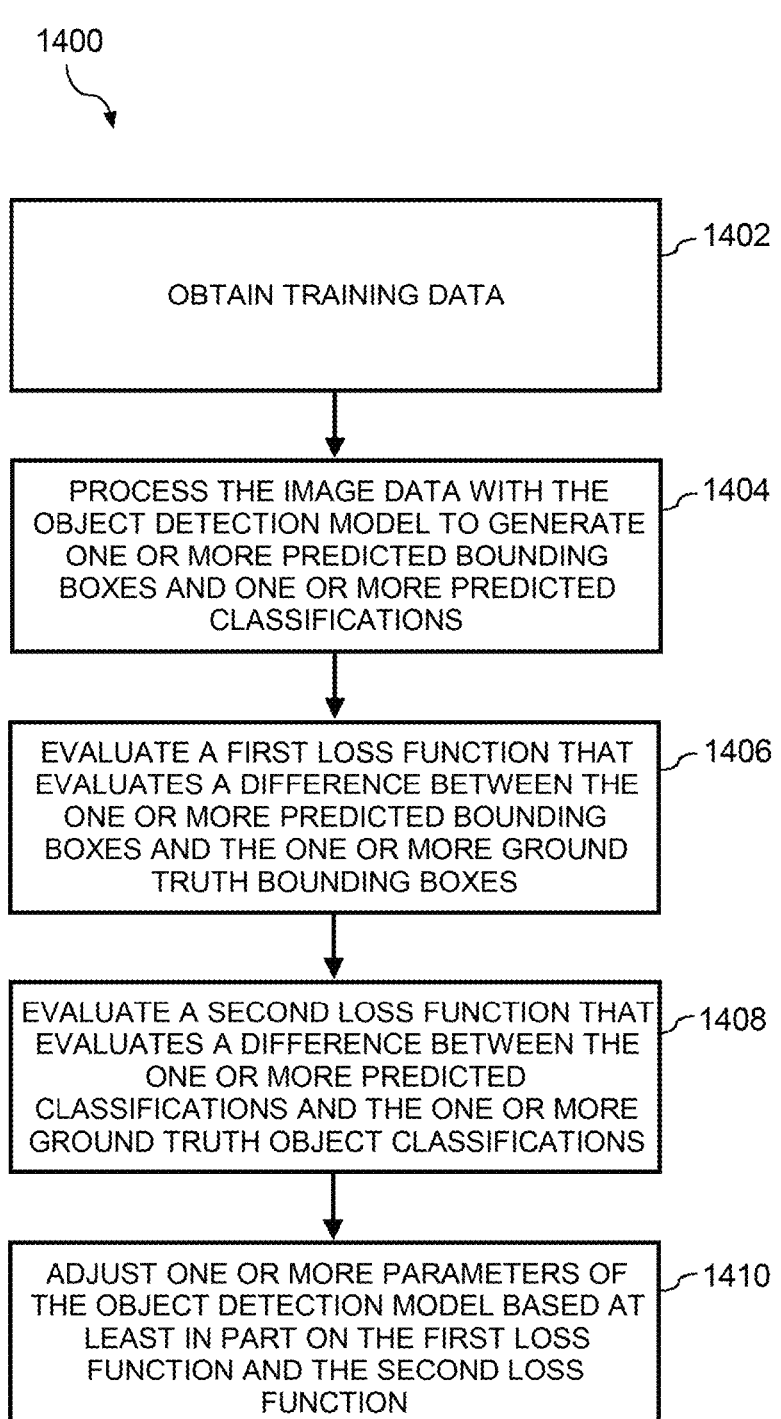

1402
OBTAIN TRAINING DATA

1404
PROCESS THE IMAGE DATA WITH THE OBJECT DETECTION MODEL TO GENERATE ONE OR MORE PREDICTED BOUNDING BOXES AND ONE OR MORE PREDICTED CLASSIFICATIONS

1406
EVALUATE A FIRST LOSS FUNCTION THAT EVALUATES A DIFFERENCE BETWEEN THE ONE OR MORE PREDICTED BOUNDING BOXES AND THE ONE OR MORE GROUND TRUTH BOUNDING BOXES

1408
EVALUATE A SECOND LOSS FUNCTION THAT EVALUATES A DIFFERENCE BETWEEN THE ONE OR MORE PREDICTED CLASSIFICATIONS AND THE ONE OR MORE GROUND TRUTH OBJECT CLASSIFICATIONS

1410
ADJUST ONE OR MORE PARAMETERS OF THE OBJECT DETECTION MODEL BASED AT LEAST IN PART ON THE FIRST LOSS FUNCTION AND THE SECOND LOSS FUNCTION

OBTAIN TRAINING DATA

1504

PROCESS THE IMAGE DATA WITH A
MACHINE-LEARNED MODEL

1506

GENERATE OUTPUT DATA IN RESPONSE TO
PROCESSING THE IMAGE DATA WITH
THE MACHINE-LEARNED MODEL

OBJECT DETECTION BASED ON ATROUS CONVOLUTION AND ADAPTIVE PROCESSING

FIELD

The present disclosure relates generally to object detection. More particularly, the present disclosure relates to an object detection that leverages atrous convolution and adaptive processing to perform object detection that is semantically aware and can be utilized for small object detection.

BACKGROUND

Deep-learning has been utilized for the field of object detection and classification (which can include Automated Target Recognition or "ATR"), yielding improvements in accuracy and reductions in false-alarm rates by up to 50% compared to traditional machine-learning methods. Existing architectures that implement deep-learning may generate results accurately and/or quickly on datasets of color images of common objects such as dogs, bicycles, and cars. The results can show that their performance may be extremely poor on small objects (e.g., objects less than 32 pixels), with average precisions less than half that of the detection accuracy of large objects (e.g., objects above 96 pixels). To reach reasonable accuracies on small objects, existing models may require 40 million parameters or more.

SUMMARY

Aspects and advantages of embodiments of the present disclosure will be set forth in part in the following description, or can be learned from the description, or can be learned through practice of the embodiments.

One example aspect of the present disclosure is directed to a computing system for object detection. The system can include one or more processors and one or more non-transitory computer-readable media that collectively store instructions that, when executed by the one or more processors, cause the computing system to perform operations. The operations can include obtaining image data. The image data can include one or more images. In some implementations, the one or more images can be descriptive of one or more objects in an environment. The operations can include processing image data with an object detection model to generate one or more bounding boxes and one or more object classifications. The object detection model may have been trained to detect and classify objects in an input image. Processing the image data with the object detection model to generate the one or more bounding boxes and the one or more object classifications can include performing a first atrous convolution on the one or more images with a first convolutional block to generate a first convolution output. The first atrous convolution can include convolution kernels that are spaced one or more pixels apart. In some implementations, processing the image data with the object detection model to generate the one or more bounding boxes and the one or more object classifications can include performing a second atrous convolution on the one or more images with a second convolutional block to generate a second convolution output and generating one or more feature maps based on the first convolution output and the second convolution output. The one or more feature maps can be descriptive of a plurality of features in the one or more images. Processing the image data with the object detection model to generate the one or more bounding boxes and the one or more object classifications can include performing spatial pooling on the one or more feature maps to generate a three-dimensional tensor representation and processing the three-dimensional tensor representation with a prediction block to generate the one or more bounding boxes and one or more object classifications. The operations can include providing the one or more bounding boxes and the one or more object classifications as output.

Another example aspect of the present disclosure is directed to a computer-implemented method for training an object detection model. The method can include obtaining, by a computing system including one or more processors, training data. The training data can include image data, one or more ground truth bounding boxes, and one or more ground truth object classifications. The image data can include one or more images. In some implementations, the one or more images can be descriptive of one or more objects in an environment. The one or more ground truth bounding boxes can be descriptive of a location for the one or more objects. The one or more ground truth object classifications can be descriptive of an object type for each of the one or more objects. The method can include processing, by the computing system, the image data with the object detection model to generate one or more predicted bounding boxes and one or more predicted classifications. The object detection model can include a plurality of atrous convolution blocks that process the one or more images to generate kernels by skipping pixels during processing. In some implementations, the kernels can be processed to generate a plurality of feature maps that are then processed to generate prediction data. The prediction data can be processed to generate the one or more predicted bounding boxes and the one or more predicted classifications. The method can include evaluating, by the computing system, a first loss function that evaluates a difference between the one or more predicted bounding boxes and the one or more ground truth bounding boxes and evaluating, by the computing system, a second loss function that evaluates a difference between the one or more predicted classifications and the one or more ground truth object classifications. The method can include adjusting, by the computing system, one or more parameters of the object detection model based at least in part on the first loss function and the second loss function.

Another example aspect of the present disclosure is directed to one or more non-transitory computer-readable media that collectively store instructions that, when executed by one or more computing devices, cause the one or more computing devices to perform operations. The operations can include obtaining image data. The image data can include one or more images. The one or more images can be descriptive of one or more objects in an environment. The operations can include processing the image data with a machine-learned model. The machine-learned model can include a backbone block, a neck block, a head block, and a prediction block. The backbone block can process an input image to perform one or more atrous convolutions. The neck block can obtain a plurality of backbone outputs associated with a plurality of backbone outputs from a plurality of backbone layers. The neck block can process the plurality of backbone outputs to generate a plurality of feature maps. The head block can process the plurality of feature maps to generate prediction data. The prediction block can process the prediction data to generate one or more prediction outputs associated with a detection of the one or more objects. The operations can include generating an output data in response to processing the image data with the machine-learned model. The output data can include one or more bounding boxes and one or more object classifications. In some implementations, the one or more bounding boxes can be associated with one or more locations for the one or more objects. The one or more object classifications can be descriptive of one or more classifications of the one or more objects.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 14 depicts a flow chart diagram of an example method to perform machine-learned model training according to example embodiments of the present disclosure.

Figure 1:
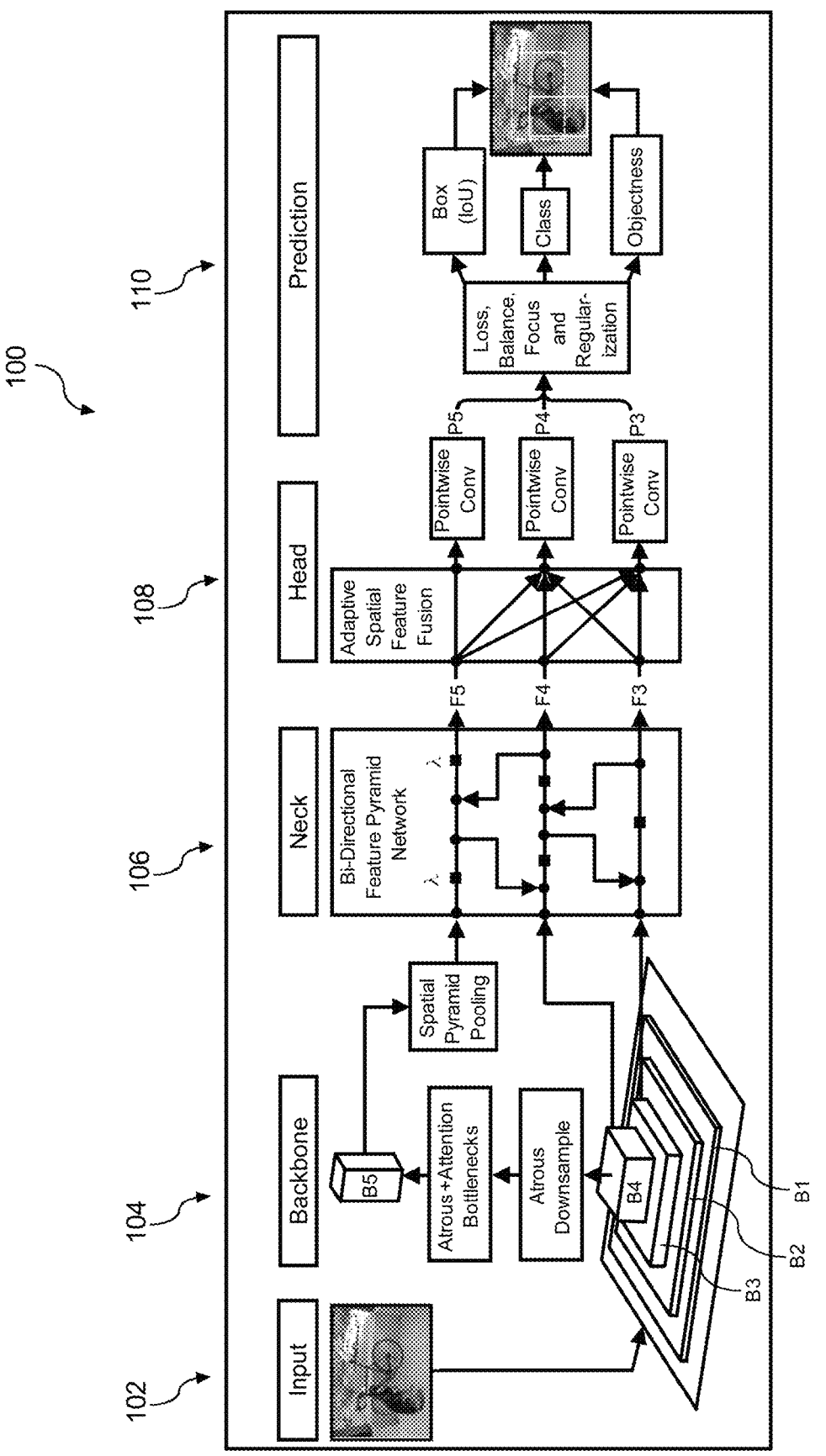
FIG. 1 depicts a block diagram of an example object detection model according to example embodiments of the present disclosure.

Reference numerals that are repeated across plural figures are intended to identify the same features in various implementations.

DETAILED DESCRIPTION

Generally, the present disclosure is directed to systems and methods for object detection. In particular, the systems and methods disclosed herein can leverage atrous downsampling, atrous upsampling, lambda blocks, coordinate convolution, adaptive spatial-field fusion, and/or spatial pyramid pooling to perform accurate and efficient object detection with less parameters. The systems and methods disclosed herein can be utilized for small objects and/or objects with a small sample size of example images. The object detection model can perform a plurality of convolutions on an input image, which can then be processed to generate feature maps. The feature maps can then be processed to generate prediction data that can be utilized to generate a bounding box and an object classification label for one or more detected objects in the input image.

For example, the systems and methods can obtain image data. The image data can include one or more images. The one or more images can be descriptive of one or more objects in an environment. The one or more objects may be depicted in thirty-two or less pixels. The one or more objects can include animals, people, vehicles, buildings, and/or other object types. The image data may be obtained from a live camera feed, a server computing system, and/or local storage. The image data may be generated with a surveillance computing device, a mobile computing device, and/or one or more other image capture devices.

The image data can be processed with an object detection model to generate one or more bounding boxes and one or more object classifications. The object detection model may have been trained to detect and classify objects in an input image. The one or more bounding boxes can be descriptive of one or more locations of interest within the one or more images. The one or more object classifications can be descriptive of a respective object classification for each of the one or more objects associated with the one or more locations of interest. For example, the bounding box may be descriptive of a region of an image that includes an object, and the object classification can be descriptive of a label for what that object is (e.g., a bicycle). Processing the image data with the object detection model to generate the one or more bounding boxes and the one or more object classifications can include one or more convolutions, the generation of one or more feature maps, spatial pooling, and the processing of a three-dimensional tensor representation.

The object detection model can perform a first atrous convolution on the one or more images with a first convolutional block to generate a first convolution output. The first atrous convolution can include convolution kernels that are spaced one or more pixels apart. Atrous (or dilated) convolution can increase the receptive field without increasing kernels by skipping "s" (e.g., one or more) pixels between each of the "k×k" kernel pixels. Atrous convolutions can mimic larger kernels, which can reduce the parameters and memory essential to perform the same processing with a network with larger convolutions.

The object model can perform a second atrous convolution on the one or more images with a second convolutional block to generate a second convolution output. The atrous convolution may be performed to capture more information on small targets.

In some implementations, the object detection model can perform one or more coordinate convolutions. Convolutional neural networks (CNN) can predict floating-point values, and image pixels may be denoted as integers. The mapping from continuous to discrete values may be performed by adding parameters to the model. Alternatively and/or additionally, coordinate convolution can be utilized, which may add two or more channels including the image coordinates to each input tensor before convolution. The coordinate convolution may include adding i,j coordinate layers before each pointwise convolution (e.g., kernel size 1×1) to contribute to the determination of bounding boxes.

The object detection model can process the first convolution output and the second convolution output with an attention block to generate an attention output. The attention block can maintain semantic information across processing blocks. The attention block can be designed to capture non-linear interactions (e.g., between pixels and/or layers). The attention block can include adaptive efficient channel attention (ECA) (e.g., Wang et al., "ECA-Net: Efficient Channel Attention for Deep Convolutional Neural Networks," ARXIV (Apr. 7, 2020), https://arxiv.org/pdf/1910.03151.pdf.). The attention block can avoid dimensionality reduction and may be dependent on two parameters (γ,b), which may make the attention processing very fast. Kernel size can be adaptively determined by $$k = \Psi(C) = \left| \frac{\log_2(C)}{\gamma} + \frac{b}{\gamma} \right|_{odd}.$$

Default values of γ=2 and b=1 may be utilized, which can perform similarly to parameter free. The object detection model disclosed herein may apply one or more attention blocks at the end of each bottleneck to maximize the semantic information included in each feature layer and may be used by each prediction layer.

Additionally and/or alternatively, processing the image data with the object detection model to generate the one or more bounding boxes and the one or more object classifications can include processing the second convolution output with an atrous upsample block to generate an upsampled output, concatenating the upsampled output and the first convolution output to generate a concatenated upsampled dataset, processing the concatenated upsampled dataset with an atrous downsampling block to generate a downsampled dataset, and generating a feature map based on a concatenation of the second convolution output and the downsampled dataset.

The object detection model can generate one or more feature maps based on the first convolution output and the second convolution output. The one or more feature maps can be descriptive of a plurality of features in the one or more images.

In some implementations, generating one or more feature maps based on the first convolution output and the second convolution output can include processing the one or more images with a third convolutional block to generate a third convolution output. The third convolution output can be descriptive of one or more kernels generated without a pixel skip. Additionally and/or alternatively, generating one or more feature maps based on the first convolution output and the second convolution output can include generating a fused feature map based at least in part on combining the first convolution output, the second convolution output, and the third convolution output. The first convolution output, the second convolution output, and the third convolution output can be combined via a learned weighted sum and pointwise convolution to generate a single output feature map. Each of the first convolution output, the second convolution output, and the third convolution output can include a different receptive-field size.

Additionally and/or alternatively, generating one or more feature maps based on the first convolution output and the second convolution output can include generating a plurality of feature maps. Processing the image data with the object detection model to generate the one or more bounding boxes and the one or more object classifications further can include processing the plurality of feature maps with a fusion block to spatially filter conflicting information to suppress inconsistency across different feature scales. The fusion block may include an adaptive receptive-field fusion (ARFF) and/or adaptive spatial-field fusion (ASFF). For example, an input layer may be convolved with normal and atrous kernels to generate feature sets with different receptive-field sizes. The intermediate maps can then be combined with a learned weighted sum and pointwise convolution to generate a single output feature map. The adaptive receptive-field fusion can be included in one or more residual blocks in the network backbone of the model to enhance the receptive field of the small convolutions, which can preserve information for the smaller targets. The object detection model can include a simple sum of the intermediate blocks (e.g., intermediate layers (A=B=C=D=1)). Adaptive spatial-field fusion can include pyramid feature fusion. The object detection model can learn to spatially filter conflictive information to suppress inconsistency across different feature scales, which may improve the scale-invariance of features. The intermediate maps can then be combined with a learned weighted sum and pointwise convolution to generate a single output feature map. The adaptive spatial-field fusion can be utilized as a final layer in a network before detection and prediction to leverage information from all spatial scales.

The object detection model can perform spatial pooling on the one or more feature maps to generate a three-dimensional tensor representation. Spatial pooling can include a spatial pyramid pooling block that removes the artificial constraint of fixed image sizes from convolutional neural networks at the end of the network's backbone. The spatial pyramid pooling block may process the plurality of feature maps to generate a three-dimensional tensor representation. The object detection model may include spatial pooling at the end before prediction.

In some implementations, processing the image data with the object detection model to generate the one or more bounding boxes and the one or more object classifications can include processing feature data with a lambda block. The lambda block can be configured to generate contextual representations for prediction. The lambda block can include an alternative self-attention to capture long-range interactions between input and structure contextual information (e.g., a pixel surrounded by other pixels). The lambda block may model both content and position-based interactions. Contextual information for query position n can be summarized into a lambda $\lambda_n \in \mathbb{R}^{k \times v}$. Applying the lambda can dynamically distribute contextual features to produce the output as $$y_n = \lambda_n^T q_n.$$

The process may capture content-based and position-based interactions without producing attention maps. The object detection model can include a lambda block in the head to maximize contextual information during predictions.

The object detection model can process the three-dimensional tensor representation with a prediction block to generate the one or more bounding boxes and one or more object classifications.

The systems and methods can provide the one or more bounding boxes and the one or more object classifications as output. The one or more bounding boxes may be utilized to annotate the one or more images and provide annotated images as the output. Additionally and/or alternatively, the one or more object classifications may be provided as object and/or image labels, which may be utilized to annotate the one or more images. In some implementations, the one or more bounding boxes and/or the one or more object classifications may be stored with the image data to be utilized as training data for a separate machine-learned model.

The object detection model can be trained, retrained, tuned, and/or prompted with one or more training datasets. Each training dataset may include a plurality of training examples. The training examples can include labeled images with ground truth bounding boxes, ground truth object classifications, and/or ground truth objectness labels. The training dataset can be utilized to train the object detection model on one object or a plurality of objects.

For example, training data can be obtained locally and/or from a server computing system. The training data can include image data, one or more ground truth bounding boxes, and one or more ground truth object classifications. The image data can include one or more images. The one or more images can be descriptive of one or more objects in an environment. The one or more ground truth bounding boxes can be descriptive of a location for the one or more objects. The one or more ground truth object classifications can be descriptive of an object type for each of the one or more objects.

The systems and methods can process the image data with the object detection model to generate one or more predicted bounding boxes and one or more predicted classifications. The object detection model can include a plurality of atrous convolution blocks that process the one or more images to generate kernels by skipping pixels during processing. The kernels can be processed to generate a plurality of feature maps that are then processed to generate prediction data. The prediction data can be processed to generate the one or more predicted bounding boxes and the one or more predicted classifications. In some implementations, the object detection model can include atrous upsampling and atrous downsampling. Feature data processed with the atrous upsampling can be concatenated with upstream feature data then processed with the atrous downsampling.

In some implementations, processing the image data with the object detection model can include generating an objectness output. The objectness output can be descriptive of a presence prediction. The presence prediction can be descriptive of whether one or more portions of the one or more images are descriptive of one or more objects.

The systems and methods can evaluate a first loss function that evaluates a difference between the one or more predicted bounding boxes and the one or more ground truth bounding boxes. The first loss function may include one or more evaluation terms, which may include an L2 loss, a standard focal loss, a class-balanced focal loss, a bounding box loss, and/or a balanced object loss.

Additionally and/or alternatively, the systems and methods can evaluate a second loss function that evaluates a difference between the one or more predicted classifications and the one or more ground truth object classifications. The second loss function may include one or more evaluation terms, which may include an L2 loss, a standard focal loss, a class-balanced focal loss, a class and object label smoothing loss, and/or a balanced object loss.

The systems and methods can adjust one or more parameters of the object detection model based at least in part on the first loss function and the second loss function. The first loss function and/or the second loss function may generate one or more gradient descents that may be backpropagated to the object detection model to adjust the one or more parameters. A subset of the parameters of the object detection model may be fixed during one or more phases of training. The fixing of the subset of parameters may mitigate overfitting and/or mitigate overcorrection.

In some implementations, the systems and methods can evaluate a third loss function that evaluates the objectness output and adjust the one or more parameters of the object detection model based at least in part on the third loss function.

Alternatively and/or additionally, the systems and methods can evaluate a combined loss function based on a standard focal loss for objects, a class-balanced focal loss, object label soothing, the first loss function comprising a bounding box loss, and a balanced object loss, and adjust the one or more parameters of the object detection model based at least in part on the combined loss function.

Once training reaches a threshold level of accuracy, the trained object detection model may be utilized for model inference to recognize objects in an image. In some implementations, model inference can include zero-shot or few-shot prompting. The object detection model can include one or more machine-learned models with each of the one or more models including one or more blocks with each block having a plurality of layers. The object detection model can include a feature extractor model, a segmentation model, a detection model, a classification model, an augmentation model, a generative image-text model, a natural language processing model, an embedding model, and/or one or more other machine-learned models. Each of the one or more machine-learned models can include one or more blocks with each block having a plurality of layers that are configured to process the data associated with the image data.

For example, the systems and methods can obtain image data. The image data can include one or more images. The one or more images can be descriptive of one or more objects in an environment. The environment may include an office, a living room, a forest, a desert, a city, a lake, a parking lot, etc. The one or more objects may be depicted in less than a sixth of the image. The one or more objects can include a particular motor vehicle, a particular projectile, a particular product, a particular landmark, a particular region specific geographic feature, a particular building, etc. The image data may be obtained from a live camera feed, a server computing system, and/or local storage. The image data may be generated with a surveillance computing device, a mobile computing device, and/or one or more other image capture devices.

The image data can be processed with a machine-learned model. The machine-learned model can include a backbone block, a neck block, a head block, and a prediction block. The machine-learned model can include an object detection model that is trained to process input images and output bounding boxes and classification labels for detected objects in the input images.

The backbone block can process an input image to perform one or more atrous convolutions. The backbone block can include a plurality of convolutional blocks. The plurality of convolutional blocks can include one or more atrous convolutional blocks. In some implementations, the backbone block can include a plurality of atrous convolutional blocks. One or more first atrous convolutional blocks and one or more second atrous convolutional blocks may skip a different number of pixels (e.g., the first atrous convolutional block(s) may skip one pixel, while the second atrous convolutional block(s) skip three pixels). In some implementations, the backbone block can include atrous downsampling, atrous upsampling, self-attention, and/or coordinate convolution.

The neck block can obtain a plurality of backbone outputs associated with a plurality of backbone outputs from a plurality of backbone layers. The neck block can process the plurality of backbone outputs to generate a plurality of feature maps. The neck block can include a bi-directional feature pyramid network. In some implementations, the neck block can include one or more residual blocks, one or more lambda blocks, one or more atrous downsampling blocks, and/or one or more atrous upsampling blocks. The neck block may be configured to concatenate convolutional outputs from different levels of the backbone block.

The head block can process the plurality of feature maps to generate prediction data. The head block can include one or more atrous upsample blocks, one or more atrous downsample blocks, and a plurality of fusion blocks. The head block may include adaptive spatial feature fusion and/or pointwise convolution.

The prediction block can process the prediction data to generate one or more prediction outputs associated with a detection of the one or more objects. The prediction block may include one or more activation blocks, one or more normalization blocks, and/or one or more smoothing blocks. In some implementations, the prediction block can include probability evaluation, ranking, and/or selection. The prediction block can include data segmentation, data augmentation, and/or data generation.

In some implementations, the machine-learned model can include a plurality of convolutional blocks, one or more bottleneck blocks, one or more self-attention blocks, and one or more normalization blocks.

The systems and methods can generate an output data in response to processing the image data with the machine-learned model. The output data can include one or more bounding boxes and one or more object classifications. The one or more bounding boxes can be associated with one or more locations for the one or more objects. The one or more object classifications can be descriptive of one or more classifications of the one or more objects. In some implementations, generating the output data can include generating an annotated image that is descriptive of the one or more images annotated with the one or more bounding boxes and the one or more object classifications.

In some implementations, the systems and methods disclosed herein can include an automated target recognition system that may include a convolutional neural network. The backbone feature extraction network the systems and methods disclosed herein can include atrous downsampling and one or more bottleneck blocks to provide multi-scale data to a bi-directional feature pyramid network. The bi-directional feature pyramid network can incorporate the lambda block through the RRL resblock. Atrous upsample and downsample blocks can connect the different levels of the feature pyramid. An Adaptive Spatial-Field Fusion (ASFF) block can combine features from the multiple spatial scales to use significantly more information when making feature identifications.

In some implementations, the systems and methods can apply an adaptive Efficient Channel Attention (ECA) block at the end of each bottleneck to maximize the semantic information contained in each feature layer. The systems and methods may employ Lambda blocks to maximize contextual information during predictions. Coordinate convolution blocks can be added before each pointwise convolution to improve the determination of bounding boxes. Additionally and/or alternatively, the systems and methods may use the Adaptive Receptive-Field Fusion (ARFF) block in residual blocks in the network backbone to significantly enhance the receptive field of the small convolutions, preserving information for small targets.

The systems and methods may use spatial pyramid pooling at the end of the backbone. The systems and methods may use an ASFF block as the final layer in the network before detection and prediction to leverage as much information as possible from all spatial scales. In some implementations, the systems and methods can include atrous upsampling, lambda layers, coordinate convolution, adaptive spatial-field fusion, and spatial pyramid pooling. For example, the object detection model may include a convolutional neural network with atrous upsampling and downsampling in the backbone, a bi-directional feature pyramid network, and the adaptive spatial feature fusion before pointwise convolution.

The systems and methods of the present disclosure provide a number of technical effects and benefits. As one example, the system and methods can be utilized to perform object detection and classification for small objects. In particular, the systems and methods disclosed herein can leverage atrous convolution, feature fusion, and spatial pooling to generate semantically-aware predictions. The systems and methods disclosed herein may be utilized for small objects and/or objects with small training dataset samples. In particular, the object model disclosed herein can be trained for object detection on a particular object with small sample size of data (e.g., one-shot training). The efficient training can be extended to small objects that may be depicted in fifty pixels or less.

Another example technical effect and benefit relates to improved computational efficiency and improvements in the functioning of a computing system. For example, a technical benefit of the systems and methods of the present disclosure is the ability to reduce the computational resources needed for training and utilizing an object detection model. In particular, the object detection model disclosed herein can perform similarly to or better than existing models, while having less parameters than the existing model. Additionally and/or alternatively, the training of the object detection model disclosed herein can include fine tuning and/or adjusting less parameters. Moreover, the systems and methods may reach a threshold accuracy with less training loops and on less training data.

With reference now to the Figures, example embodiments of the present disclosure will be discussed in further detail.

FIG. 1 depicts a block diagram of an example object detection model 100 according to example embodiments of the present disclosure. The object detection model 100 can be trained and/or configured to process an input image 102 to generate one or more outputs, which may include one or more bounding boxes, one or more object classifications, and/or one or more objectness predictions.

The object detection model 100 can include a plurality of processing blocks that may include a plurality of processing layers. The plurality of processing blocks can include a backbone block 104, a neck block 106, a head block 108, and/or a prediction block 110.

The backbone block 104 can process the input image 102 to perform one or more convolutions, which may include one or more atrous convolutions (i.e., one or more dilated convolutions). The backbone block 104 can include a plurality of convolutional blocks, which may include one or more convolutional neural networks. The plurality of convolutional blocks can include one or more atrous convolutional blocks and/or one or more no-skip convolutional blocks. In some implementations, the backbone block 104 may perform one or more atrous downsamplings and may perform one or more atrous upsamplings. In some implementations, the backbone block 104 may perform coordinate convolution, spatial pyramid pooling, and/or self-attention.

The neck block 106 can obtain a plurality of backbone outputs generated with a plurality of backbone sub-blocks. The neck block 106 can process the plurality of backbone outputs to generate a plurality of feature maps. The neck block 106 may include a bi-directional feature pyramid network. In some implementations, the neck block 106 can include one or more residual blocks, one or more lambda blocks, one or more atrous downsampling blocks, and/or one or more atrous upsampling blocks. The neck block 106 may be configured to concatenate convolutional outputs from different levels of the backbone block 104.

The head block 108 can process the plurality of feature maps to generate prediction data. The head block 108 can include one or more atrous upsample blocks, one or more atrous downsample blocks, and a plurality of fusion blocks. The head block 108 may perform adaptive spatial feature fusion and/or pointwise convolution.

The prediction block 110 can process the prediction data to generate one or more prediction outputs associated with a detection of the one or more objects. The prediction block 110 may include one or more activation blocks, one or more normalization blocks, and/or one or more smoothing blocks. In some implementations, the prediction block 110 can include probability evaluation, ranking, and/or selection. The prediction block 110 can include data segmentation, data augmentation, and/or data generation. The prediction block 110 may process the output(s) of the head block 108 to generate one or more bounding boxes, one or more object classifications, and/or one or more objectness predictions. In some implementations, the prediction block 110 may generate an annotated image that annotates the input image 102 with the one or more bounding boxes, the one or more object classifications, and/or the one or more objectness predictions.

The object detection model 100 can include a plurality of convolutional blocks, one or more bottleneck blocks, one or more self-attention blocks, and/or one or more normalization blocks.

Figure 2:
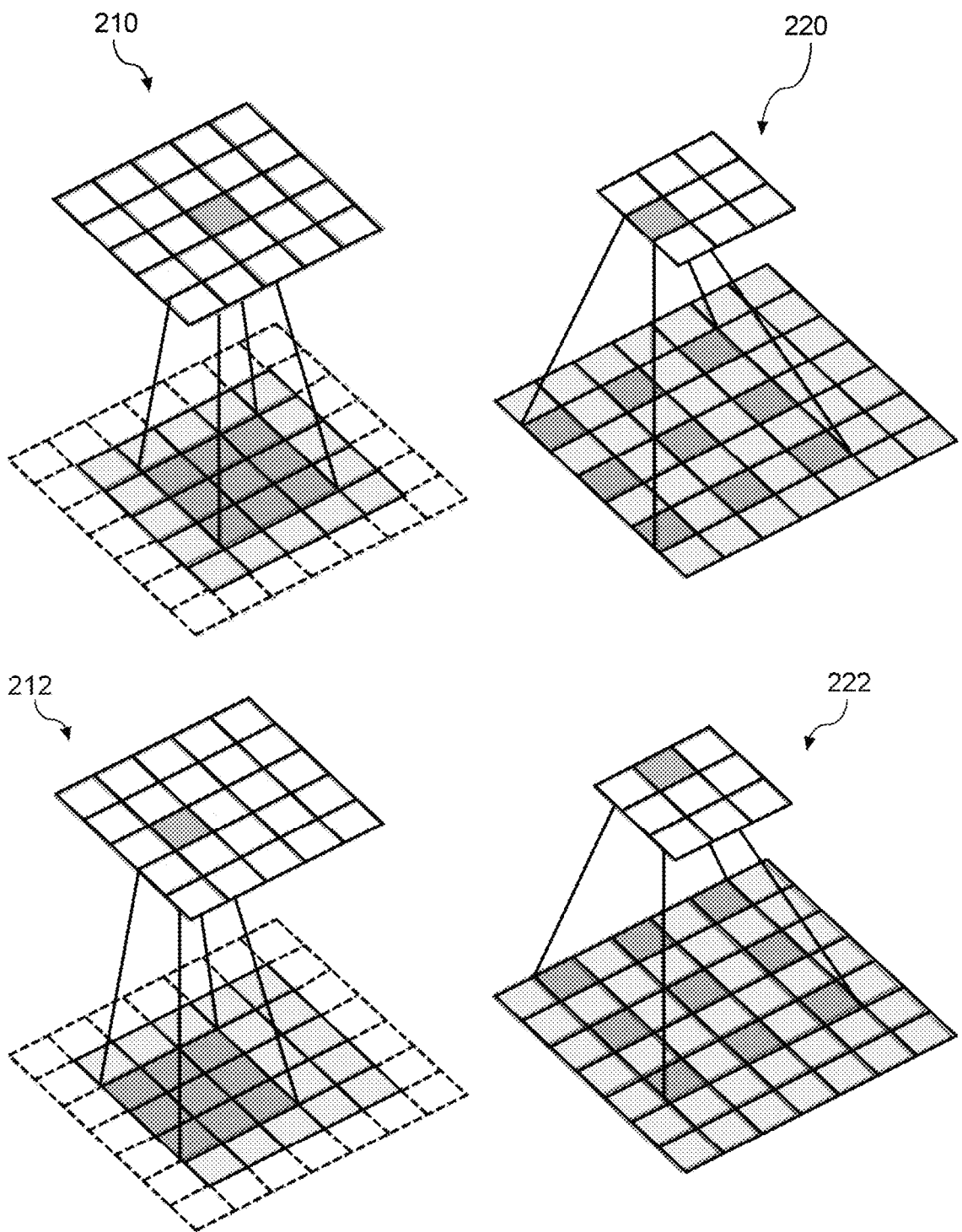
FIG. 2 depicts a block diagram of an example atrous convolution according to example embodiments of the present disclosure.

FIG. 2 depicts a block diagram of an example atrous convolution according to example embodiments of the present disclosure. The atrous convolution can be utilized to increase the receptive field without being dependent on larger kernels by skipping "s" pixels between each of the "k×k" kernel pixels. The atrous convolution can be utilized to emulate larger kernels, which may reduce the parameters and/or memory that is required to perform a given convolution.

FIG. 2 depicts an atrous convolution alongside regular convolution. In particular, a k=3×3 convolution for a regular convolution versus an atrous convolution can cover a same size pixel grid with less kernels. The regular convolutions (210 and 212) may have a 3×3 field of view, while the atrous convolutions (220 and 222) may have a 5×5 field of view. The atrous convolution can provide the same or greater field of view for less computational cost and may map semantic information not found in regular convolution (e.g., as discussed in Prove, "An Introduction to different Types of Convolutions in Deep Learning," Medium (Jul. 22, 2017), https://towardsdatascience.com/types-of-convolutions-in-deep-learning-717013397f4d).

Figure 3:
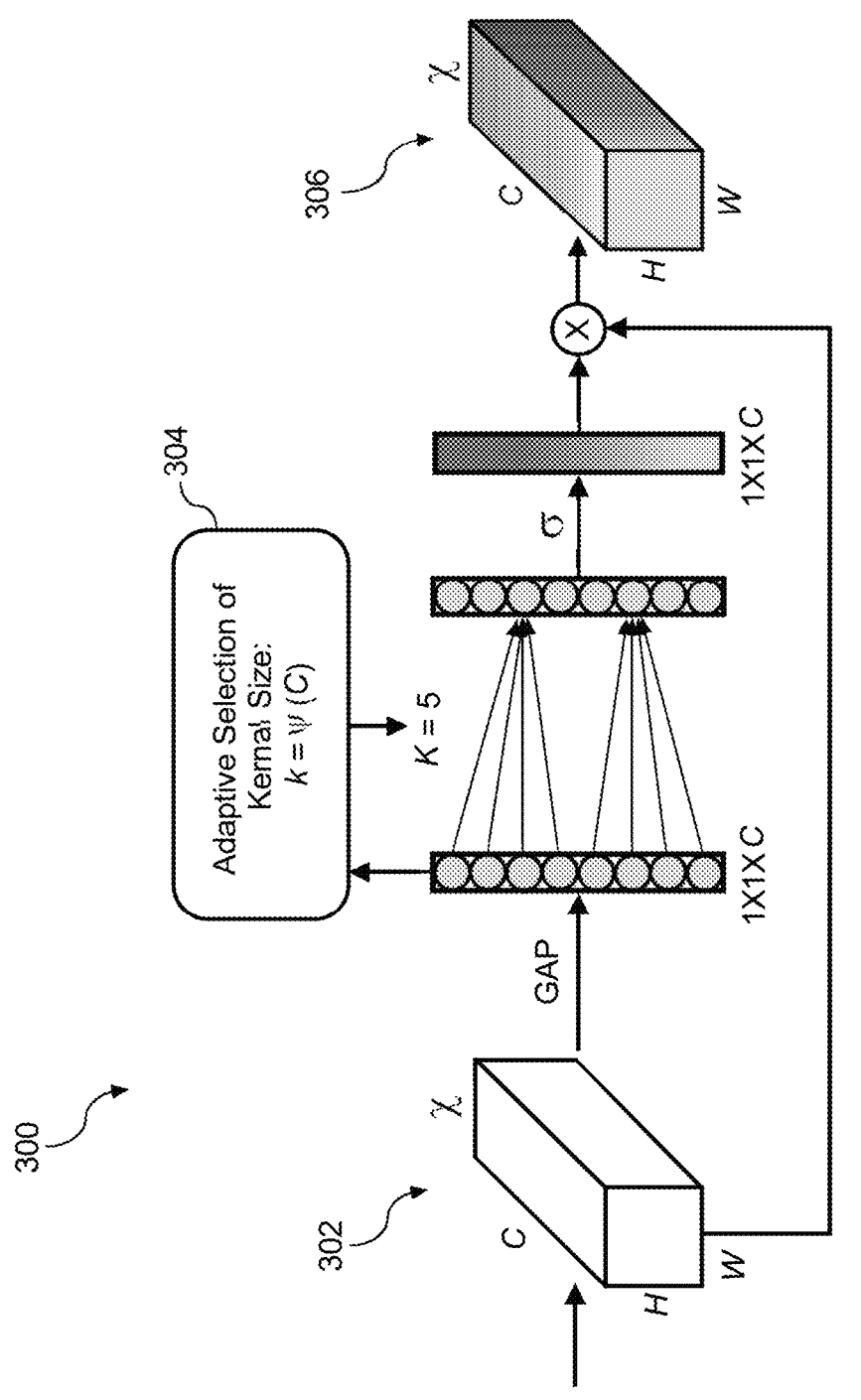
FIG. 3 depicts a block diagram of an example adaptive efficient channel attention according to example embodiments of the present disclosure.

FIG. 3 depicts a block diagram of an example adaptive efficient channel attention 300 according to example embodiments of the present disclosure. The attention block can include adaptive efficient channel attention (ECA) 300 (e.g., Wang et al., "ECA-Net: Efficient Channel Attention for Deep Convolutional Neural Networks," Arxiv (Apr. 7, 2020), https://arxiv.org/pdf/1910.03151.pdf.). The attention block can be designed to capture non-linear interactions between pixels and/or layers. Additionally and/or alternatively, the attention block can utilize adaptive efficient channel attention 300 to avoid dimensionality reduction and may be dependent on two parameters (γ,b), which may make the attention processing very fast. Kernel size can be adaptively determined by $$k = \Psi(C) = \left| \frac{\log_2(C)}{\gamma} + \frac{b}{\gamma} \right|_{odd}.$$

Default values of γ=2 and b=1 may be utilized, which can perform similarly to parameter free. The object detection model disclosed herein may apply one or more attention blocks at the end of each bottleneck to maximize the semantic information included in each feature layer and may be used by each prediction layer.

In particular, FIG. 3 can depict an example adaptive efficient channel attention 300. Adaptive efficient channel attention 300 can include obtaining aggregate features 302 by global average pooling. Adaptive selection of the kernel size 304 can be performed. One or more convolutions can then be performed based on the adaptive kernel selection of the kernel size 304. Channel weights can then be generated, an element-wise product between the channel weight output and the aggregated features can be performed to generate the channel attention output 306.

Figure 4A:
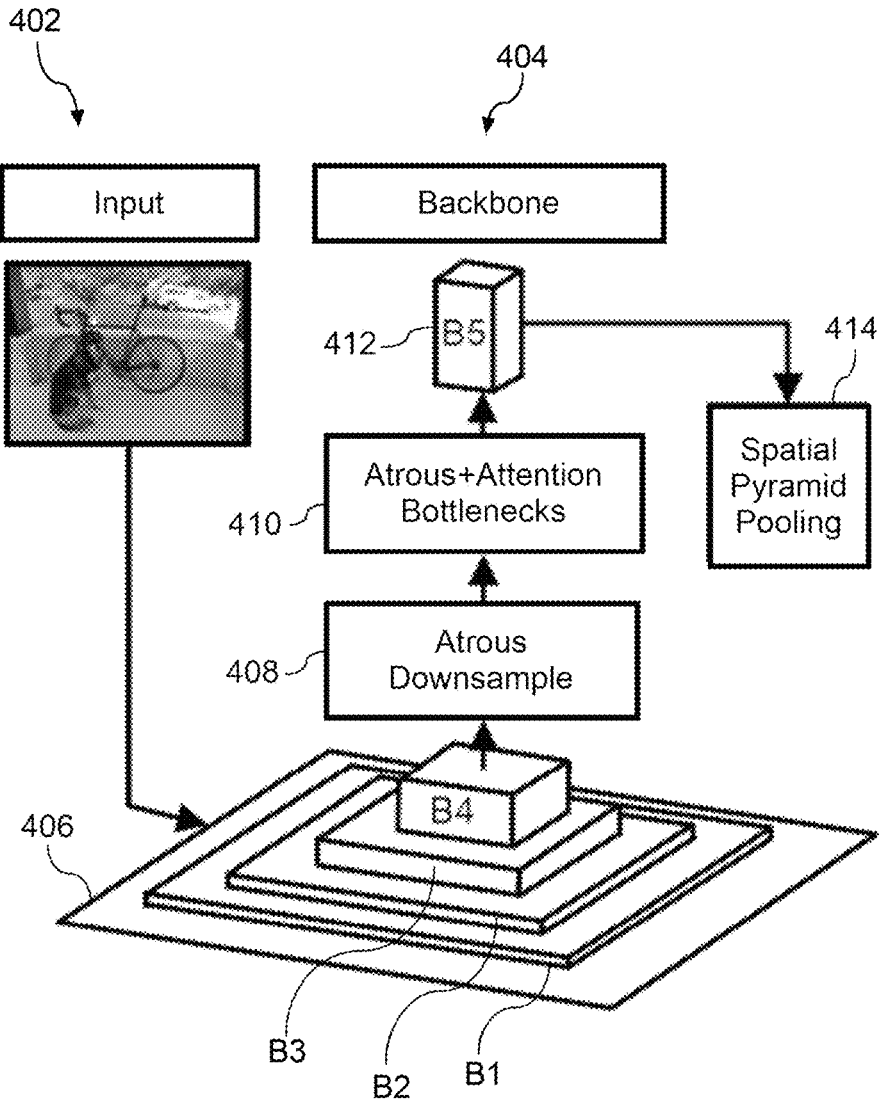
FIG. 4A depicts a block diagram of an example backbone block according to example embodiments of the present disclosure.

FIG. 4A depicts a block diagram of an example backbone block 404 according to example embodiments of the present disclosure. In particular, FIG. 4A depicts an input image 402 being processed with a backbone block 404. The backbone block 404 can include image pre-processing. The input image 402 can then be processed with a plurality of convolutional blocks 406. Outputs of the plurality of convolutional blocks 406 may be transmitted to the neck block 420 of FIG. 4B. One or more of the outputs of the convolutional blocks may be processed to perform an atrous downsample 408. The downsampled output can then be processed with one or more atrous and attention bottleneck blocks 410. The output of the bottleneck blocks 410 may be embedded 412 and may be processed with a spatial pyramid pooling block 414 before being processed with the neck block 420.

Figure 4B:
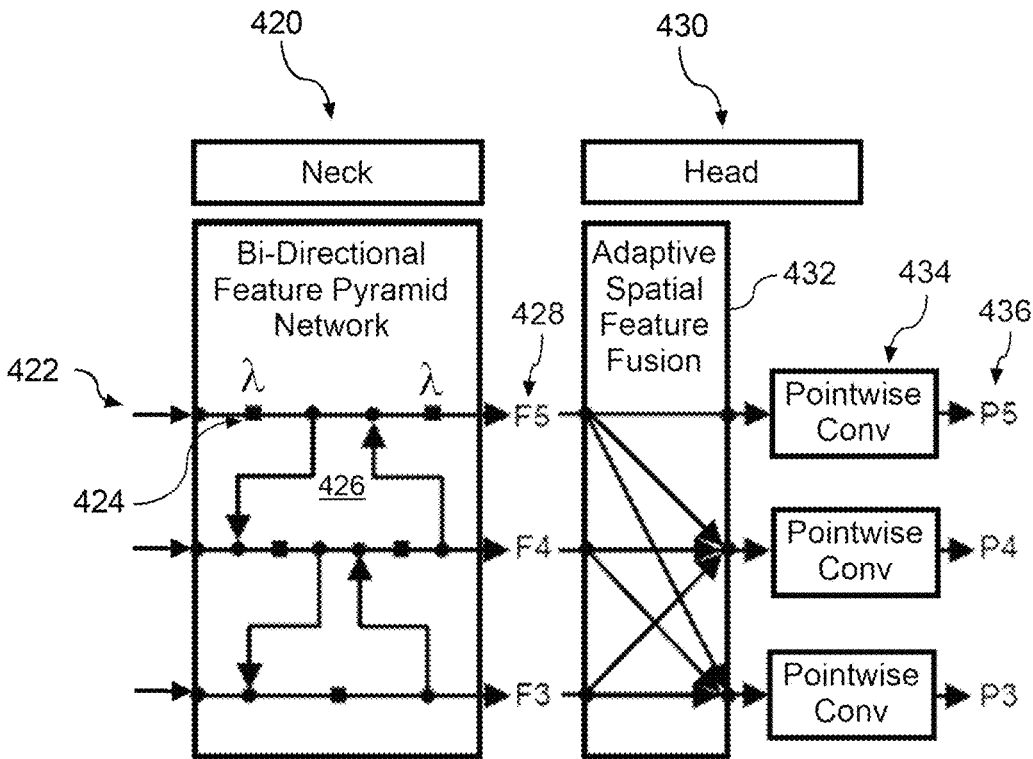
FIG. 4B depicts a block diagram of an example neck block and head block according to example embodiments of the present disclosure.

FIG. 4B depicts a block diagram of an example neck block 420 and head block 430 according to example embodiments of the present disclosure. In particular, the neck block 420 can process the backbone block output 422 to generate one or more feature maps 428. In some implementations, the neck block 420 can include a bi-directional feature pyramid network that may include one or more lambda blocks 424, one or more residual blocks, one or more atrous upsamples and atrous downsamples 426, and/or one or more concatenations.

The head block 430 can process the plurality of feature maps 428 to generate a plurality of prediction datasets 436. The head block 430 can perform adaptive spatial feature fusion 432 on the plurality of feature maps 428 and may perform pointwise convolution 434 to generate the plurality of prediction datasets 436.

Figure 4C:
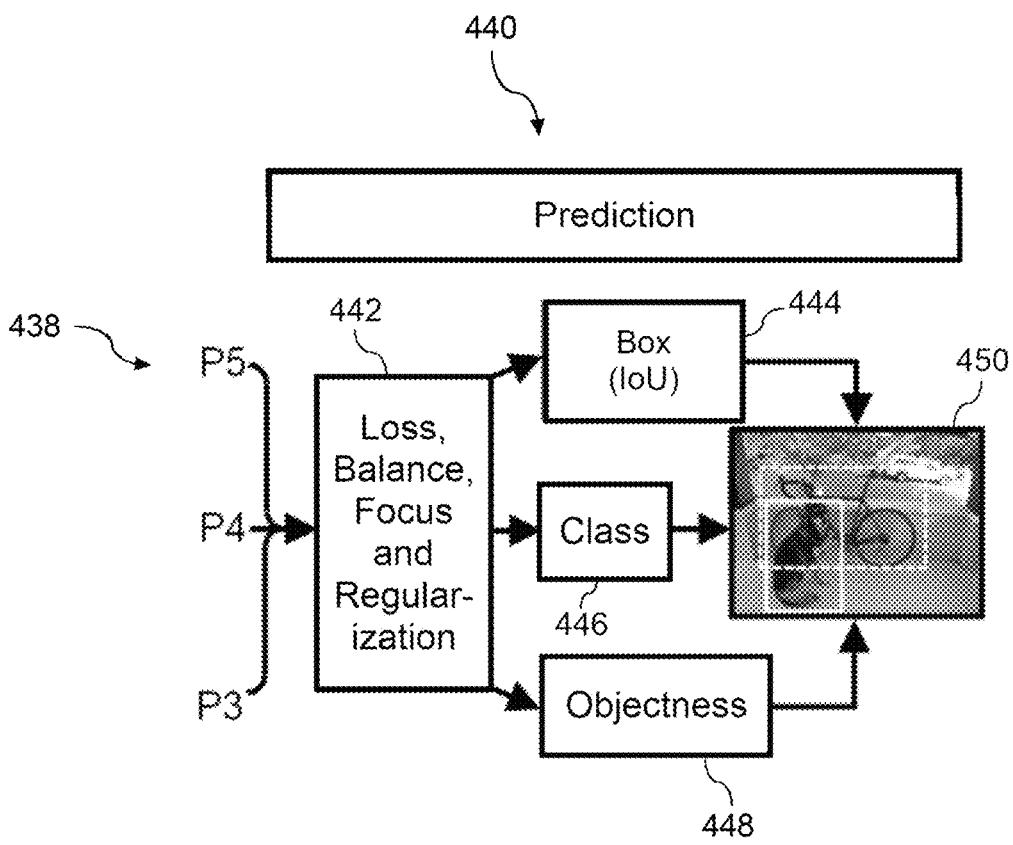
FIG. 4C depicts a block diagram of an example prediction block according to example embodiments of the present disclosure.

FIG. 4C depicts a block diagram of an example prediction block 440 according to example embodiments of the present disclosure. The prediction block 440 can process the plurality of prediction datasets 438 to generate an annotated image 450 that annotates the input image 402 with one or more bounding boxes 444, one or more object classifications 446, and one or more objectness predictions 448. The prediction block 440 can tune the object detection model, balance, focus, and regularize 442 the data to generate the one or more bounding boxes 444, the one or more object classifications 446, and the one or more objectness predictions 448. The one or more bounding boxes 444, the one or more object classifications 446, and the one or more objectness predictions 448 can then be processed to perform the image augmentation to generate the annotated image 450.

Figure 5:
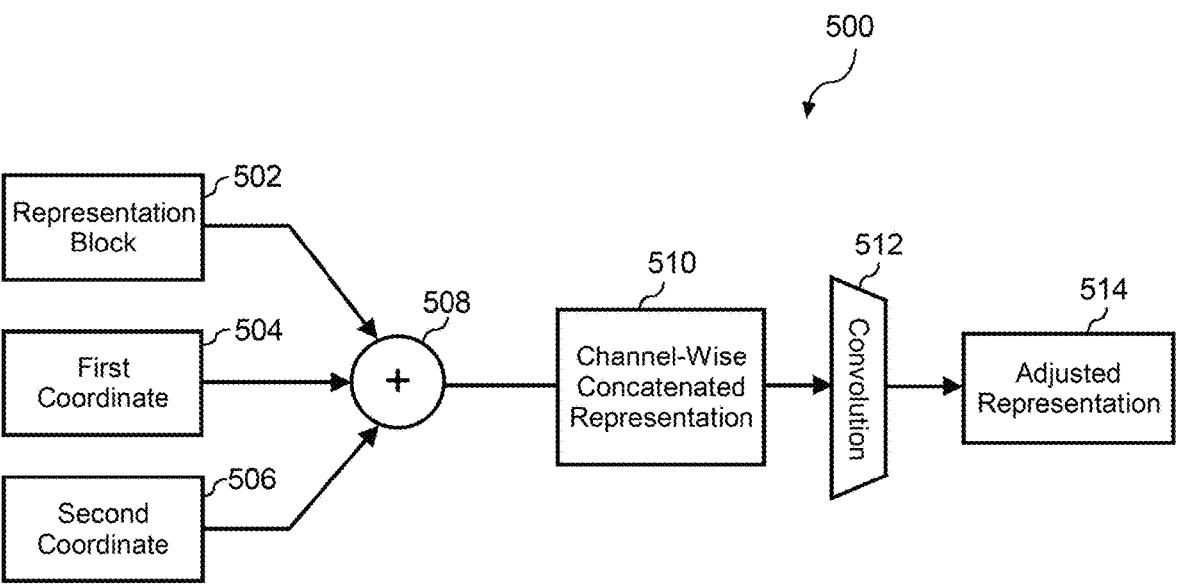
FIG. 5 depicts a block diagram of an example coordinate convolution according to example embodiments of the present disclosure.

FIG. 5 depicts a block diagram of an example coordinate convolution 500 according to example embodiments of the present disclosure. In some implementations, the object detection model can perform one or more coordinate convolutions 500. Convolutional neural networks (CNN) can predict floating-point values, and image pixels may be denoted as integers. The mapping from continuous to discrete values may be performed by adding parameters to the model. Alternatively and/or additionally, coordinate convolution 500 can be utilized, which may add two or more channels including the image coordinates to each input tensor before convolution. The coordinate convolution 500 may include adding i,j coordinate layers before each pointwise convolution (e.g., kernel size 1×1) to contribute to the determination of bounding boxes.

In particular, the coordinate convolution 500 (e.g., as depicted in Liu et al., "An intriguing failing of convolutional neural networks and the CoordConv solution," ARXIV (Dec. 3, 2018), https://arxiv.org/pdf/1807.03247.pdf.) can include obtaining a representation block 502 that is descriptive of one or more representations (e.g., a spatial representation, a Cartesian representation, a pixel-based representation, and/ or a one-hot representation). A first coordinate 504 and a second coordinate 506 associated with the representation block 502 may be obtained.

The representation block 502, the first coordinate 504, and the second coordinate 506 can be concatenated 508 to generate a channel-wise concatenated representation 510. A convolution 512 can then be performed on the channel-wise concatenated representation 510 to generate an adjusted representation 514 that is coordinate-aware.

Figure 6:
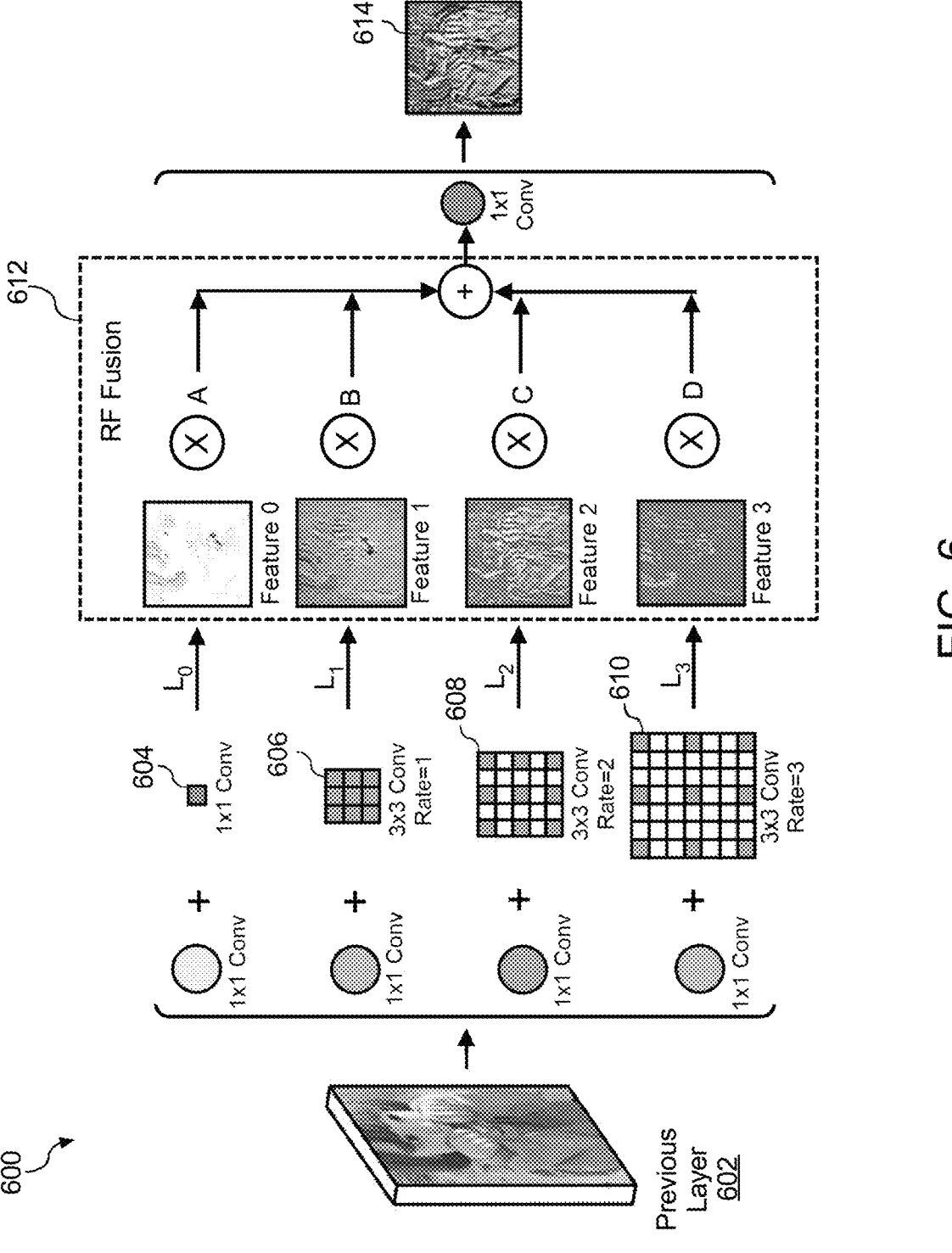
FIG. 6 depicts a block diagram of an example adaptive receptive-field fusion according to example embodiments of the present disclosure.

FIG. 6 depicts a block diagram of an example adaptive receptive-field fusion 600 according to example embodiments of the present disclosure. Adaptive receptive-field fusion 600 (e.g., the ARFF in Jia et al., "Lightweight Feature Enhancement Network for Single-Shot Object Detection," MDPI (Feb. 4, 2021), https://www.mdpi.com/1424-8220/21/4/1066.) can be utilized in the residual blocks of the object detection model (e.g., in the network backbone). The adaptive receptive-field fusion 600 can enhance the receptive field of the small convolutions, which can preserve information for small targets. In some implementations, the adaptive receptive-field fusion 600 in the object detection model may perform a sum of the intermediate layers.

In particular, adaptive receptive-field fusion 600 can process a plurality of convolutions associated with an input image 602 to generate a feature map 614 for the input image 602. The plurality of convolutions can include a 1×1 regular convolution 604, a 3×3 regular convolution 606, a 3×3 atrous convolution with a rate two skip 608, and a 3×3 atrous convolution with a rate three skip 610. In some implementations, the plurality of convolutions may be concatenated with one or more 1×1 convolutions. The receptive-field fusion 612 can include element-wise multiplication associated with one or more feature representations associated with the convolutions. The outputs of the multiplication may be processed with the weighted fusion to generate the feature map 614 descriptive of a plurality of extracted features from the input image 602.

Figure 7:
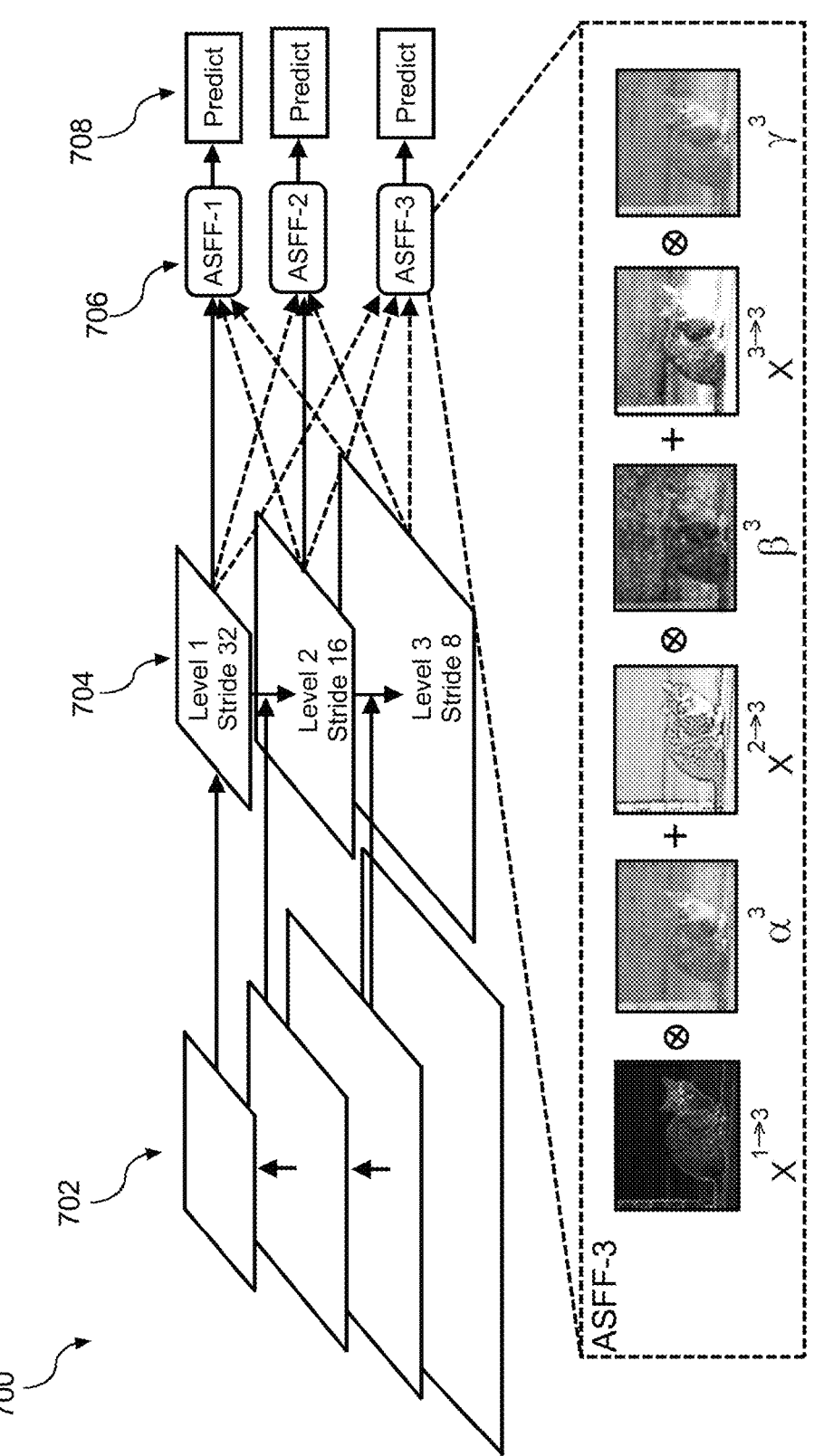
FIG. 7 depicts a block diagram of an example adaptive spatial-field fusion according to example embodiments of the present disclosure.

FIG. 7 depicts a block diagram of an example adaptive spatial-field fusion 700 according to example embodiments of the present disclosure. Adaptive spatial-field fusion 700 (e.g., the ASFF in Liu et al. "Receptive Field Block Net for Accurate and Fast Object Detection," ARXIV (Jul. 26, 2018), https://arxiv.org/pdf/1711.07767.pdf.) can be utilized in the head block of the object detection model to leverage information from a plurality of spatial scales. Adaptive spatial-field fusion 700 can include obtaining outputs from a plurality of downstream processing blocks 702. The plurality of processing blocks can include feature extraction with varying stride values 704 that can generate a plurality of feature maps. The feature maps may be resized to a uniform and spatially fused via one or more ASFF blocks 706. The outputs of the ASFF blocks 706 may then be utilized to generate prediction data 708 that can then be processed by the prediction block to detect and classify the features.

Figure 8:
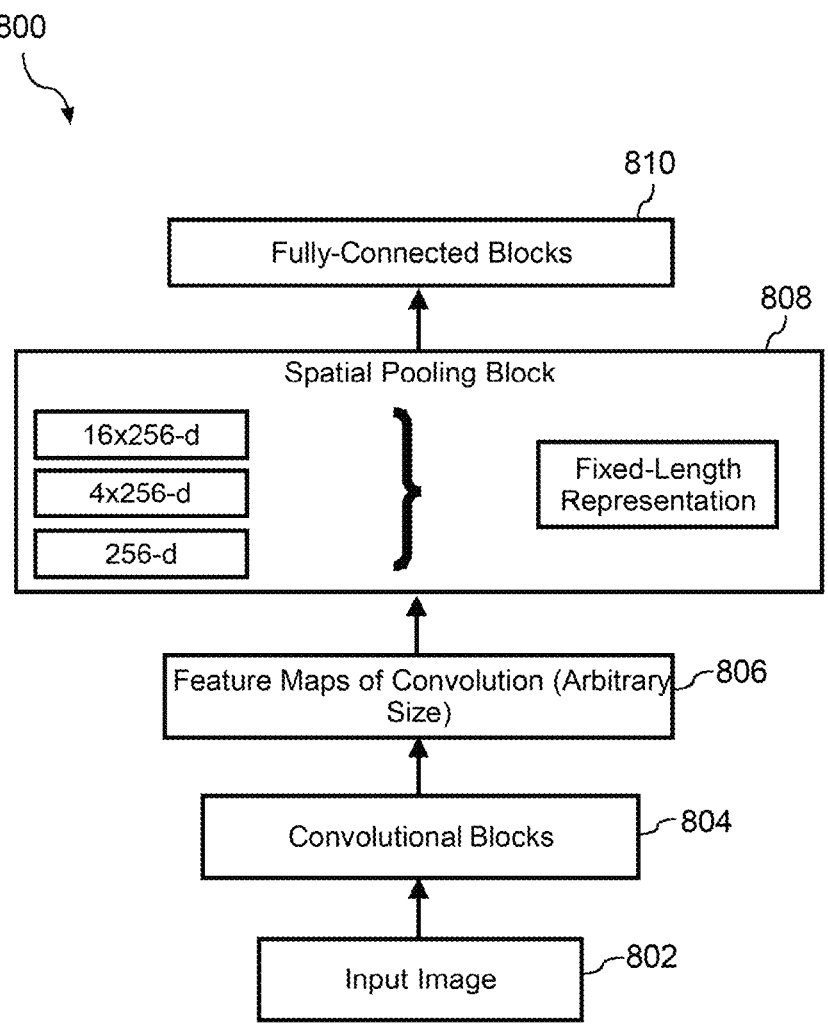
FIG. 8 depicts a block diagram of an example spatial pyramid pooling according to example embodiments of the present disclosure.

FIG. 8 depicts a block diagram of an example spatial pyramid pooling 800 according to example embodiments of the present disclosure. Spatial pyramid pooling 800 (which can include the spatial pyramid pooling of He et al., "Spatial Pyramid Pooling in Deep Convolutional Networks for Visual Recognition," ARXIV (Apr. 23, 2015), https://arxiv.org/pdf/1406.4729.pdf.) can include processing a plurality of feature maps 806 with a spatial pooling block 808 to generate a fixed-length representation.

In particular, an input image 802 can be processed with a plurality of convolutional blocks 804 to generate a plurality of feature maps 806. The plurality of feature maps 806 can then be processed with the spatial pooling block 808. The spatial pooling block 808 can process feature map data associated with a plurality of different scales, a plurality of different bins, a plurality of different sizes, and/or a plurality of different filters to generate the fixed-length representation. The fixed-length representation can include a plurality of dimensional vectors that can then be processed by a plurality of fully-connected blocks 810 of the object detection model.

Figure 9:
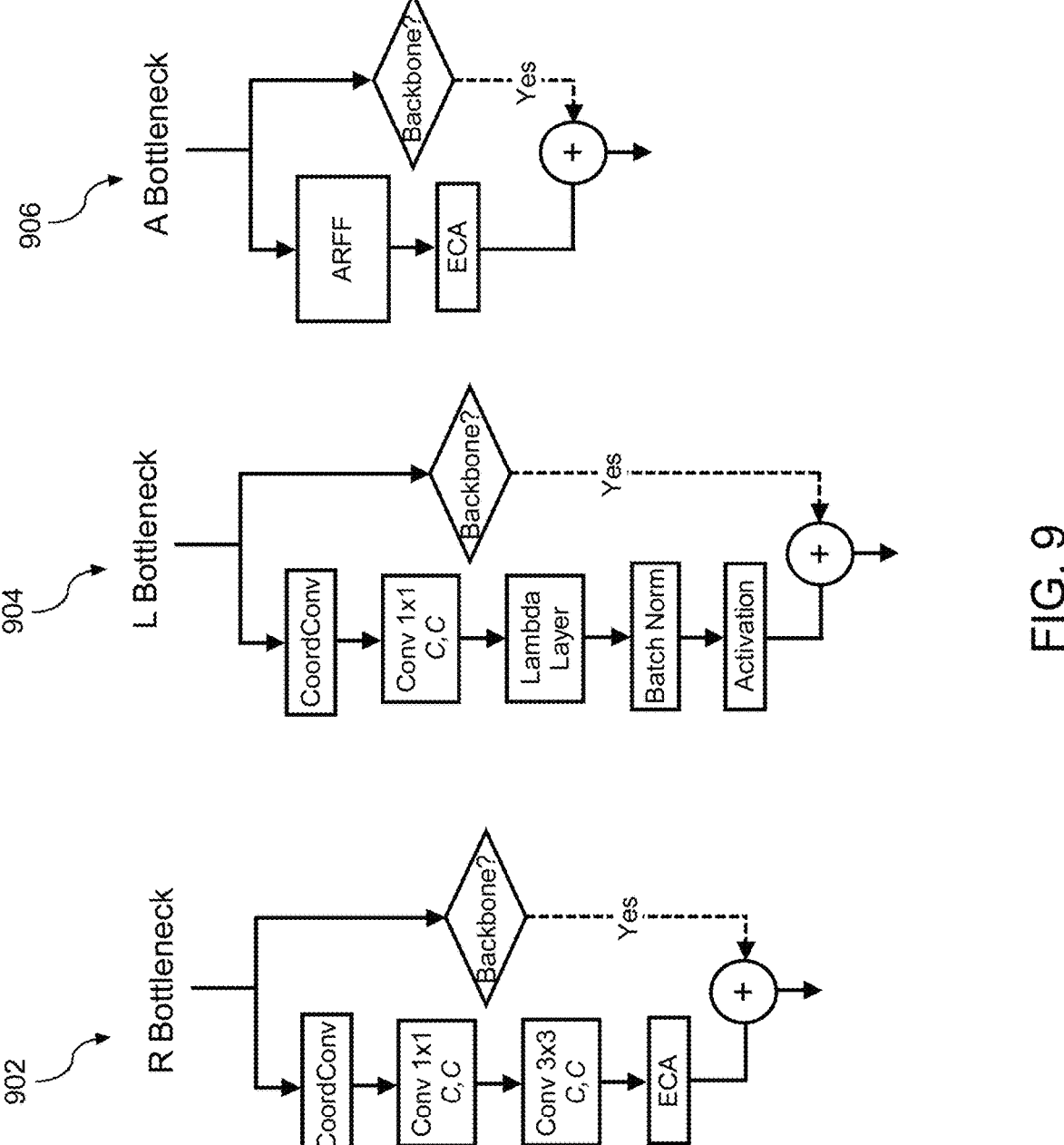
FIG. 9 depicts block diagrams of example bottleneck blocks according to example embodiments of the present disclosure.

FIG. 9 depicts block diagrams of example bottleneck blocks according to example embodiments of the present disclosure. The object detection model can include one or more bottleneck blocks of a plurality of different configurations. For example, the R bottleneck 902 can include a coordinate convolution, a k=1×1 convolution, a k=3×3 convolution, and an adaptive efficient channel attention block. In some implementations, the R bottleneck 902 can include a conditional bypass loop that concatenates the backbone output with the adaptive efficient channel attention block output.

The L bottleneck 904 can include a coordinate convolution, a k=1×1 convolution, a lambda block, a batch normalization, and an activation block. In some implementations, the L bottleneck 904 can include a conditional bypass loop that concatenates the backbone output with the activation block output.

The A bottleneck 906 can include an adaptive receptive-field fusion block and adaptive efficient channel attention block. In some implementations, the A bottleneck 906 can include a conditional bypass loop that concatenates the backbone output with the adaptive efficient channel attention block output.

The R bottleneck 902, the L bottleneck 904, and the A bottleneck 906 may be utilized in combination and/or in isolation. In some implementations, the bottlenecks can be utilized with a recurrent loop that may include a stop threshold before providing an output to the next block.

Figure 10:
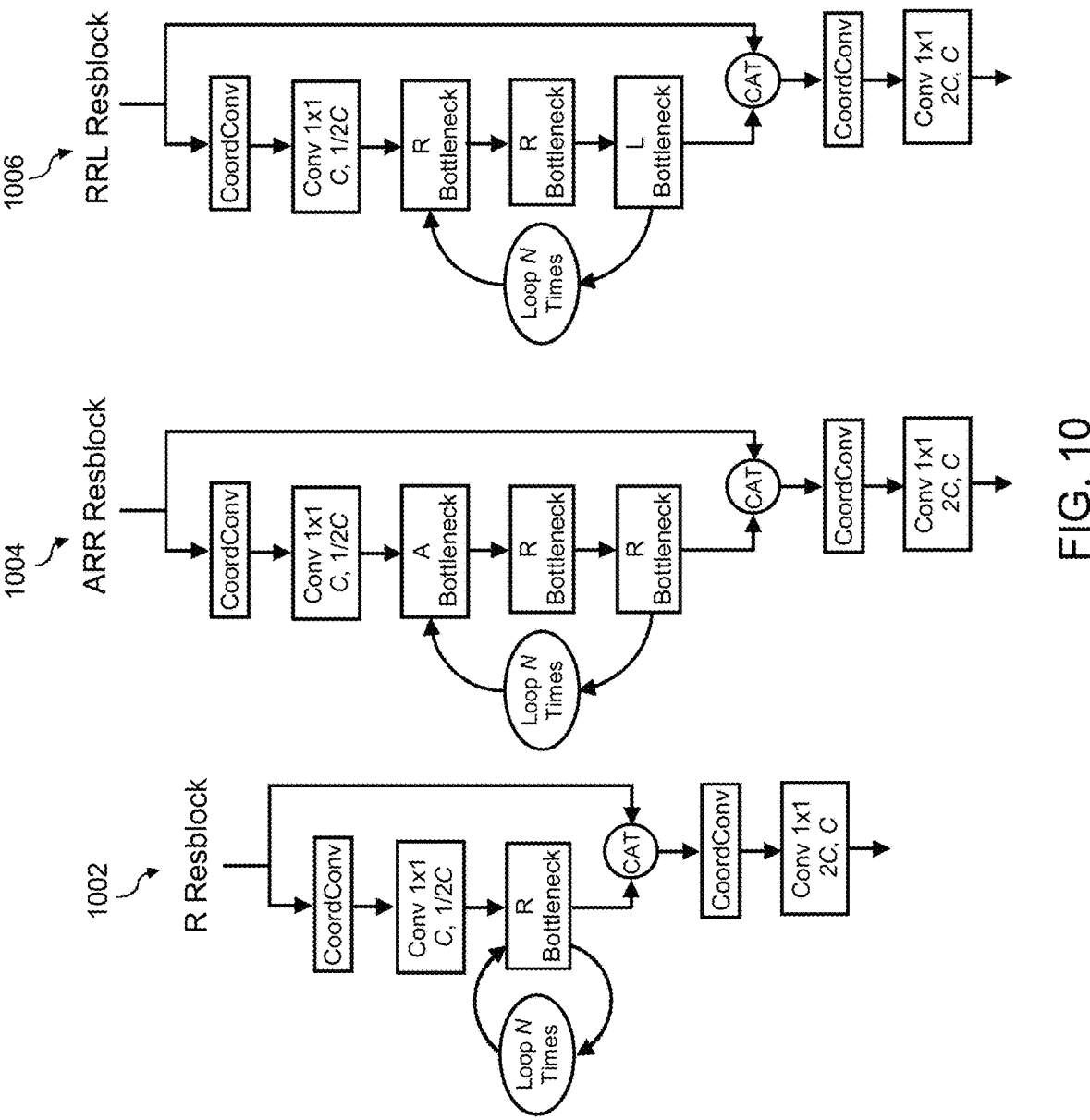
FIG. 10 depicts block diagrams of example residual blocks according to example embodiments of the present disclosure.

FIG. 10 depicts block diagrams of example residual blocks according to example embodiments of the present disclosure. The object detection model can include one or more Resblocks (e.g., residual blocks) of a plurality of different configurations. For example, the R Resblock 1002 can include a coordinate convolution, a k=1×1 convolution, and one or more processing loops with an R bottleneck block. In some implementations, the R Resblock 1002 can include a bypass loop that concatenates the Resblock input with the bottleneck processing loop output. The concatenation output can then be processed with a coordinate convolution block and a k=1×1 convolution block.

The ARR Resblock 1004 can include a coordinate convolution, a k=1×1 convolution, and one or more processing loops with an A bottleneck and two or more R bottleneck blocks. In some implementations, the ARR Resblock 1004 can include a bypass loop that concatenates the Resblock input with the bottleneck processing loop output. The concatenation output can then be processed with a coordinate convolution block and a k=1×1 convolution block.

The RRL Resblock 1006 can include a coordinate convolution, a k=1×1 convolution, and one or more processing loops with two or more R bottleneck blocks and a L bottleneck block. In some implementations, the RRL Resblock 1006 can include a bypass loop that concatenates the Resblock input with the bottleneck processing loop output. The concatenation output can then be processed with a coordinate convolution block and a k=1×1 convolution block.

The R Resblock 1002, the ARR Resblock 1004, and the RRL Resblock 1006 may be utilized in combination and/or in isolation. In some implementations, the Resblocks can be utilized with a recurrent loop that may include a stop threshold before providing an output to the next block.

Figure 11:
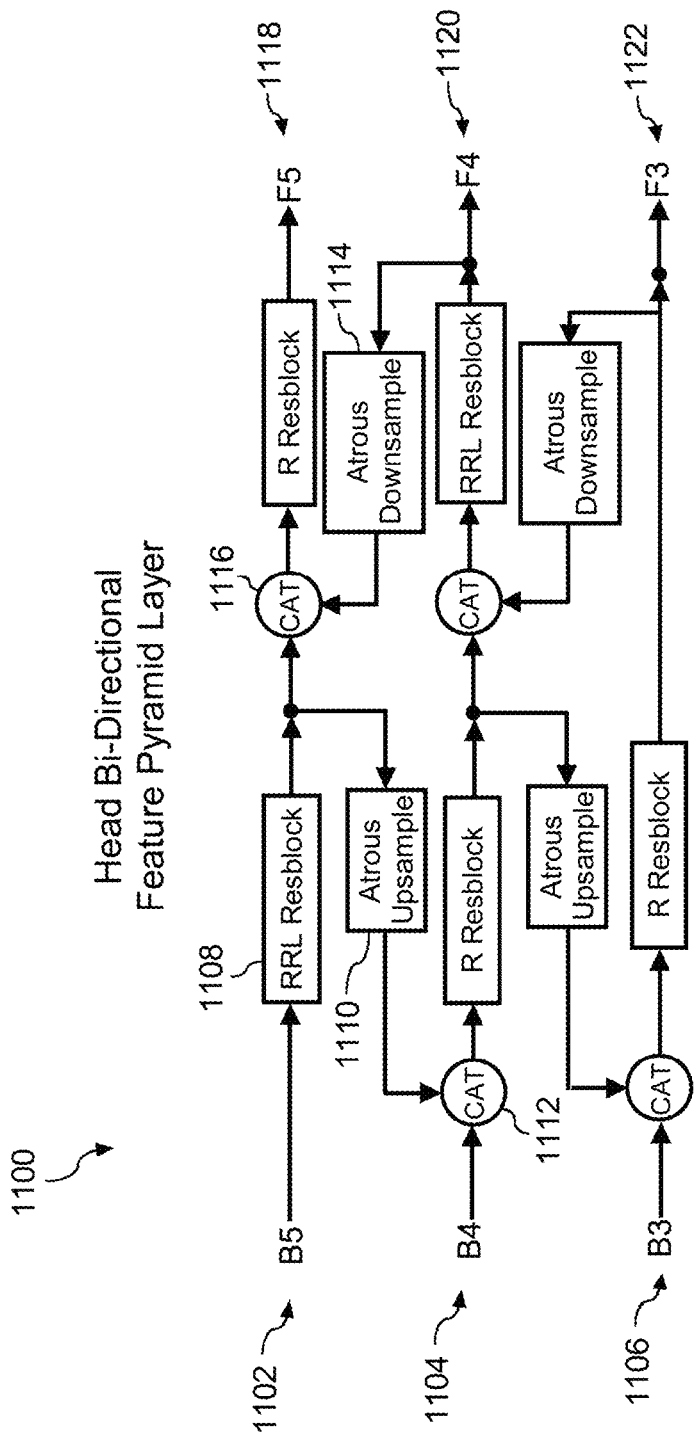
FIG. 11 depicts a block diagram of an example bi-directional feature pyramid block according to example embodiments of the present disclosure.

FIG. 11 depicts a block diagram of an example bi-directional feature pyramid block 1100 according to example embodiments of the present disclosure. The bi-directional feature pyramid block 1100 can process a plurality of convolutional block outputs (e.g., a first convolutional block output 1102, a second convolutional block output 1104, and a third convolutional block output 1106) to generate a plurality of feature maps (e.g., a first feature map 1118, a second feature map 1120, and a third feature map 1122).

For example, the first convolutional block output can be processed with an RRL Resblock 1108, processed with an atrous upsample block 1110, and concatenated 1112 with the second convolutional block output 1104. The concatenated output can be processed with one or more resblocks, concatenated with an atrous downsample from the third convolutional block output 1106 pipeline, processed with another RRL Resblock, and then processed with an atrous downsample block 1114 before being concatenated 1116 with the RRL Resblock 1108 output. The concatenated output can then be processed with another resblock to generate the first feature map 1118. A similar pipeline can be performed at each level to generate other feature maps associated with other convolutional block outputs.

Figure 12:
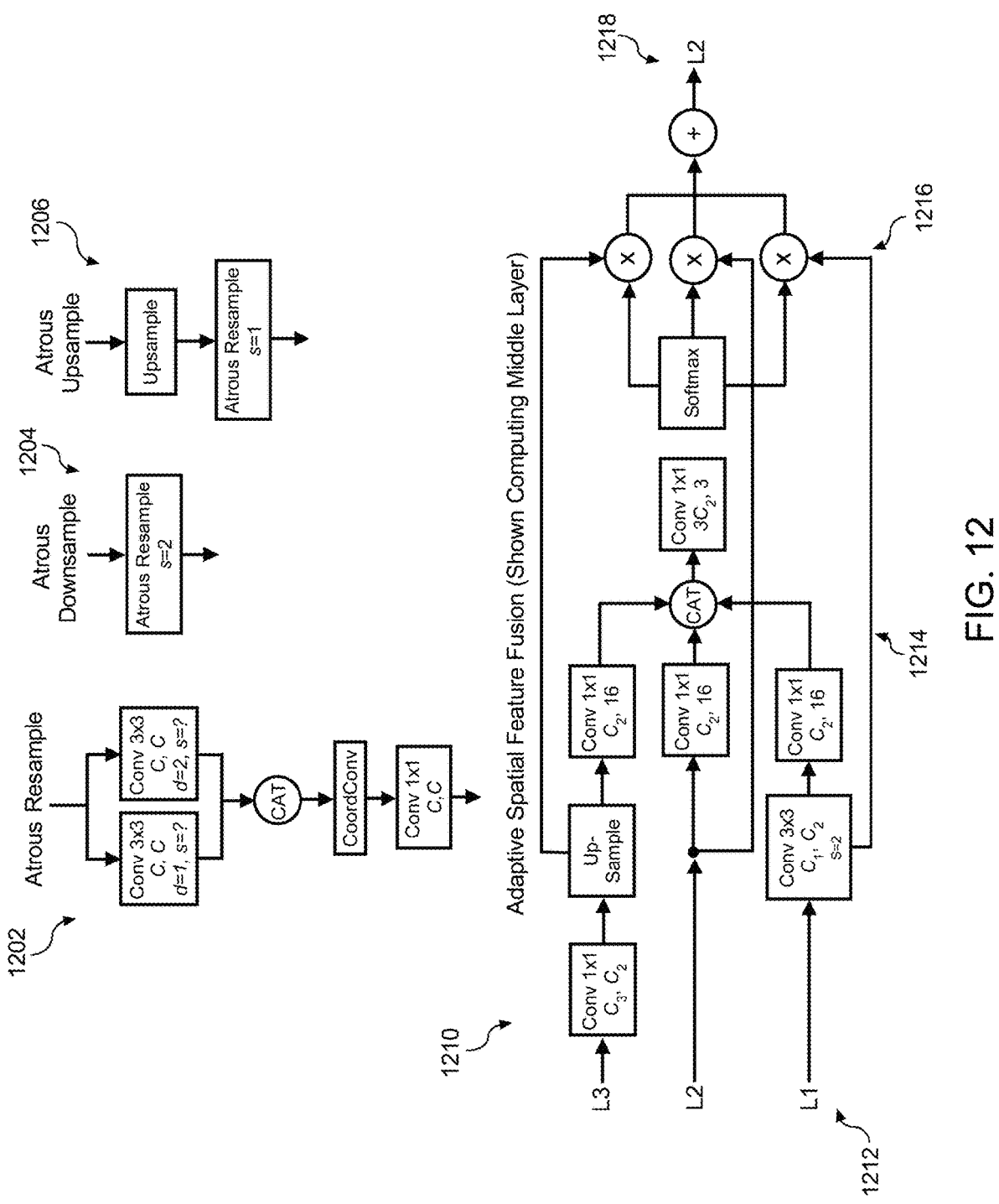
FIG. 12 depicts a block diagram of an example feature fusion according to example embodiments of the present disclosure.

FIG. 12 depicts a block diagram of an example feature fusion according to example embodiments of the present disclosure. In particular, FIG. 12 depicts example configurations for an atrous resample block 1202, an atrous downsample block 1204, an atrous upsample block 1206, and an adaptive spatial feature fusion block 1210.

The atrous resample block 1202 can include parallel k=3×3 atrous convolution blocks with differing dilation rates that can then be concatenated. The concatenation output can then be processed with a coordinate convolution and a k=1×1 convolution.

The atrous downsample block 1204 can include an atrous resample with a skip rate of two. The atrous upsample block 1206 can include an upsample followed by an atrous resample with a skip rate of one.

The adaptive spatial feature fusion block 1210 can process a plurality of previous block outputs 1212 to generate a fusion output 1218. The plurality of previous block outputs 1212 may be obtained from different levels of the processing stream. The plurality of previous block outputs 1212 can be processed with a plurality of sub-blocks 1214, which can include a plurality of convolutional blocks, one or more upsample blocks, one or more concatenations, and one or more softmax blocks. The adaptive spatial feature fusion block 1210 may include one or more bypasses and may include a plurality of element-wise multiplications 1216 to be performed on outputs of the upsample block, the convolutional blocks, and the softmax block. The outputs of the plurality of element-wise multiplications 1216 may be summed (e.g., via a weighted sum) and/or concatenated to generate the fusion output 1218.

Figure 13:
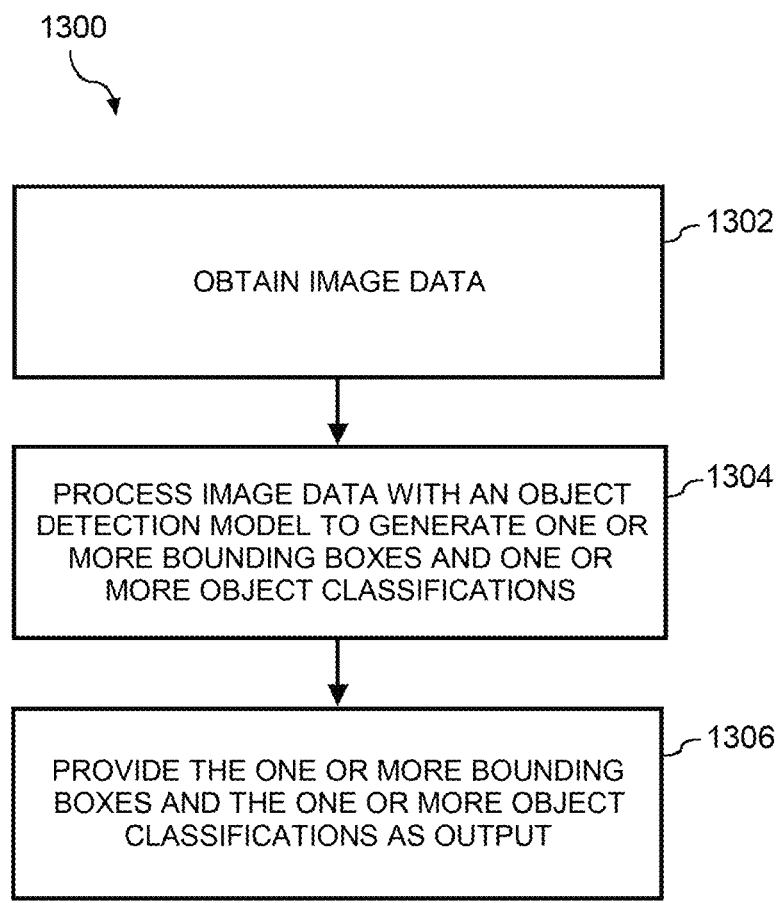
FIG. 13 depicts a flow chart diagram of an example method to perform object detection according to example embodiments of the present disclosure.

FIG. 13 depicts a flow chart diagram of an example method to perform according to example embodiments of the present disclosure. Although FIG. 13 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

At 1302, a computing system can obtain image data. The image data can include one or more images. The one or more images can be descriptive of one or more objects in an environment. The one or more objects may be depicted in thirty-two or less pixels. The one or more objects can include animals, people, vehicles, buildings, and/or other object types. The image data may be obtained from a live camera feed, a server computing system, and/or local storage. The image data may be generated with a surveillance computing device, a mobile computing device, and/or one or more other image capture devices.

At 1304, the computing system can process image data with an object detection model to generate one or more bounding boxes and one or more object classifications. The object detection model may have been trained to detect and classify objects in an input image. The one or more bounding boxes can be descriptive of one or more locations of interest within the one or more images. The one or more object classifications can be descriptive of a respective object classification for each of the one or more objects associated with the one or more locations of interest. For example, the bounding box may be descriptive of a region of an image that includes an object, and the object classification can be descriptive of a label for what that object is (e.g., a bicycle). Processing the image data with the object detection model to generate the one or more bounding boxes and the one or more object classifications can include one or more convolutions, the generation of one or more feature maps, spatial pooling, and the processing of a three-dimensional tensor representation.

The object detection model can perform a first atrous convolution on the one or more images with a first convolutional block to generate a first convolution output. The first atrous convolution can include convolution kernels that are spaced one or more pixels apart. Atrous (or dilated) convolution can increase the receptive field without increasing kernels by skipping "s" (e.g., one or more) pixels between each of the "k×k" kernel pixels. Atrous convolutions can mimic larger kernels, which can reduce the parameters and memory essential to perform the same processing with a network with larger convolutions.

The object model can perform a second atrous convolution on the one or more images with a second convolutional block to generate a second convolution output. The atrous convolution may be performed to capture more information on small targets.

In some implementations, the object detection model can perform one or more coordinate convolutions. Convolutional neural networks (CNN) can predict floating-point values, and image pixels may be denoted as integers. The mapping from continuous to discrete values may be performed by adding parameters to the model. Alternatively and/or additionally, coordinate convolution can be utilized, which may add two or more channels including the image coordinates to each input tensor before convolution. The coordinate convolution may include adding i,j coordinate layers before each pointwise convolution (e.g., kernel size 1×1) to contribute to the determination of bounding boxes.

The object detection model can process the first convolution output and the second convolution output with an attention block to generate an attention output. The attention block can maintain semantic information across processing blocks. The attention block can be designed to capture non-linear interactions (e.g., between pixels and/or layers). The attention block can include adaptive efficient channel attention (ECA) (e.g., Wang et al., "ECA-Net: Efficient Channel Attention for Deep Convolutional Neural Networks," ARXIV (Apr. 7, 2020), https://arxiv.org/pdf/1910.03151.pdf.). The attention block can avoid dimensionality reduction and may be dependent on two parameters ($\gamma$,b), which may make the attention processing very fast. Kernel size can be adaptively determined by $$k = \Psi(C) = \left| \frac{\log_2(C)}{\gamma} + \frac{b}{\gamma} \right|_{odd}.$$

Default values of $\gamma=2$ and b=1 may be utilized, which can perform similarly to parameter free. The object detection model disclosed herein may apply one or more attention blocks at the end of each bottleneck to maximize the semantic information included in each feature layer and may be used by each prediction layer.

In some implementations, processing the image data with the object detection model to generate the one or more bounding boxes and the one or more object classifications can include processing the second convolution output with an atrous upsample block to generate an upsampled output, concatenating the upsampled output and the first convolution output to generate a concatenated upsampled dataset, processing the concatenated upsampled dataset with an atrous downsampling block to generate a downsampled dataset, and generating a feature map based on a concatenation of the second convolution output and the downsampled dataset.

The object model can generate one or more feature maps based on the first convolution output and the second convolution output. The one or more feature maps can be descriptive of a plurality of features in the one or more images.

In some implementations, generating one or more feature maps based on the first convolution output and the second convolution output can include processing the one or more images with a third convolutional block to generate a third convolution output. The third convolution output can be descriptive of one or more kernels generated without a pixel skip. Additionally and/or alternatively, generating one or more feature maps based on the first convolution output and the second convolution output can include generating a fused feature map based at least in part on combining the first convolution output, the second convolution output, and the third convolution output. The first convolution output, the second convolution output, and the third convolution output can be combined via a learned weighted sum and pointwise convolution to generate a single output feature map. Each of the first convolution output, the second convolution output, and the third convolution output can include a different receptive-field size.

In some implementations, generating one or more feature maps based on the first convolution output and the second convolution output can include generating a plurality of feature maps. Processing the image data with the object detection model to generate the one or more bounding boxes and the one or more object classifications further can include processing the plurality of feature maps with a fusion block to spatially filter conflicting information to suppress inconsistency across different feature scales. The fusion block may include an adaptive receptive-field fusion (ARFF) and/or adaptive spatial-field fusion (ASFF). For example, an input layer may be convolved with normal and atrous kernels to generate feature sets with different receptive-field sizes. The intermediate maps can then be combined with a learned weighted sum and pointwise convolution to generate a single output feature map. The adaptive receptive-field fusion can be included in one or more residual blocks in the network backbone of the model to enhance the receptive field of the small convolutions, which can preserve information for the smaller targets. The object detection model can include a simple sum of the intermediate blocks (e.g., intermediate layers (A=B=C=D=1)). Adaptive spatial-field fusion can include pyramid feature fusion. The object detection model can learn to spatially filter conflictive information to suppress inconsistency across different feature scales, which may improve the scale-invariance of features. The intermediate maps can then be combined with a learned weighted sum and pointwise convolution to generate a single output feature map. The adaptive spatial-field fusion can be utilized as a final layer in a network before detection and prediction to leverage information from all spatial scales.

The object detection model can perform spatial pooling on the one or more feature maps to generate a three-dimensional tensor representation. Spatial pooling can include a spatial pyramid pooling block that removes the artificial constraint of fixed image sizes from convolutional neural networks at the end of the network's backbone. The spatial pyramid pooling block may process the plurality of feature maps to generate a three-dimensional tensor representation. The object detection model may include spatial pooling at the end before prediction.

In some implementations, processing the image data with the object detection model to generate the one or more bounding boxes and the one or more object classifications can include processing feature data with a lambda block (e.g., the lambda network of Bello, "LamdaNetworks: Modeling Long-range Interactions Without Attention," ARXIV (Feb. 17, 2021), https://arxiv.org/pdf/2102.08602.pdf.). The lambda block can be configured to generate contextual representations for prediction. The lambda block can include an alternative self-attention to capture long-range interactions between input and structure contextual information (e.g., a pixel surrounded by other pixels). The lambda block may model both content and position-based interactions. Contextual information for query position n can be summarized into a lambda $\lambda_n \in \mathbb{R}^{k \times v}$. Applying the lambda can dynamically distribute contextual features to produce the output as $$y_n = \lambda_n^T q_n.$$

The process may capture content-based and position-based interactions without producing attention maps. The object detection model can include a lambda block in the head to maximize contextual information during predictions.

The object detection model can process the three-dimensional tensor representation with a prediction block to generate the one or more bounding boxes and one or more object classifications.

At 1306, the computing system can provide the one or more bounding boxes and the one or more object classifications as output. The one or more bounding boxes may be utilized to annotate the one or more images and provide annotated images as the output. Additionally and/or alternatively, the one or more object classifications may be provided as object and/or image labels, which may be utilized to annotate the one or more images. In some implementations, the one or more bounding boxes and/or the one or more object classifications may be stored with the image data to be utilized as training data for a separate machine-learned model.

FIG. 14 depicts a flow chart diagram of an example method to perform according to example embodiments of the present disclosure. Although FIG. 14 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

At 1402, a computing system can obtain training data. The training data can include image data, one or more ground truth bounding boxes, and one or more ground truth object classifications. The image data can include one or more images. The one or more images can be descriptive of one or more objects in an environment. The one or more ground truth bounding boxes can be descriptive of a location for the one or more objects. The one or more ground truth object classifications can be descriptive of an object type for each of the one or more objects.

At 1404, the computing system can process the image data with the object detection model to generate one or more predicted bounding boxes and one or more predicted classifications. The object detection model can include a plurality of atrous convolution blocks that process the one or more images to generate kernels by skipping pixels during processing. The kernels can be processed to generate a plurality of feature maps that are then processed to generate prediction data. The prediction data can be processed to generate the one or more predicted bounding boxes and the one or more predicted classifications. In some implementations, the object detection model can include atrous upsampling and atrous downsampling. Feature data processed with the atrous upsampling can be concatenated with upstream feature data then processed with the atrous downsampling.

In some implementations, processing the image data with the object detection model can include generating an objectness output. The objectness output can be descriptive of a presence prediction. The presence prediction can be descriptive of whether one or more portions of the one or more images are descriptive of one or more objects.

At 1406, the computing system can evaluate a first loss function that evaluates a difference between the one or more predicted bounding boxes and the one or more ground truth bounding boxes. The first loss function may include one or more evaluation terms, which may include an L2 loss, a standard focal loss, a class-balanced focal loss, a bounding box loss, and/or a balanced object loss.

At 1408, the computing system can evaluate a second loss function that evaluates a difference between the one or more predicted classifications and the one or more ground truth object classifications. The second loss function may include one or more evaluation terms, which may include an L2 loss, a standard focal loss, a class-balanced focal loss, a class and object label smoothing loss, and/or a balanced object loss.

At 1410, the computing system can adjust one or more parameters of the object detection model based at least in part on the first loss function and the second loss function. The first loss function and/or the second loss function may generate one or more gradient descents that may be back-propagated to the object detection model to adjust the one or more parameters. A subset of the parameters of the object detection model may be fixed during one or more phases of training. The fixing of the subset of parameters may mitigate overfitting and/or mitigate overcorrection.

In some implementations, the computing system can evaluate a third loss function that evaluates the objectness output and adjust the one or more parameters of the object detection model based at least in part on the third loss function.

Alternatively and/or additionally, the computing system can evaluate a combined loss function based on a standard focal loss for objects, a class-balanced focal loss, object label soothing, the first loss function comprising a bounding box loss, and a balanced object loss, and adjust the one or more parameters of the object detection model based at least in part on the combined loss function.

Figure 15:
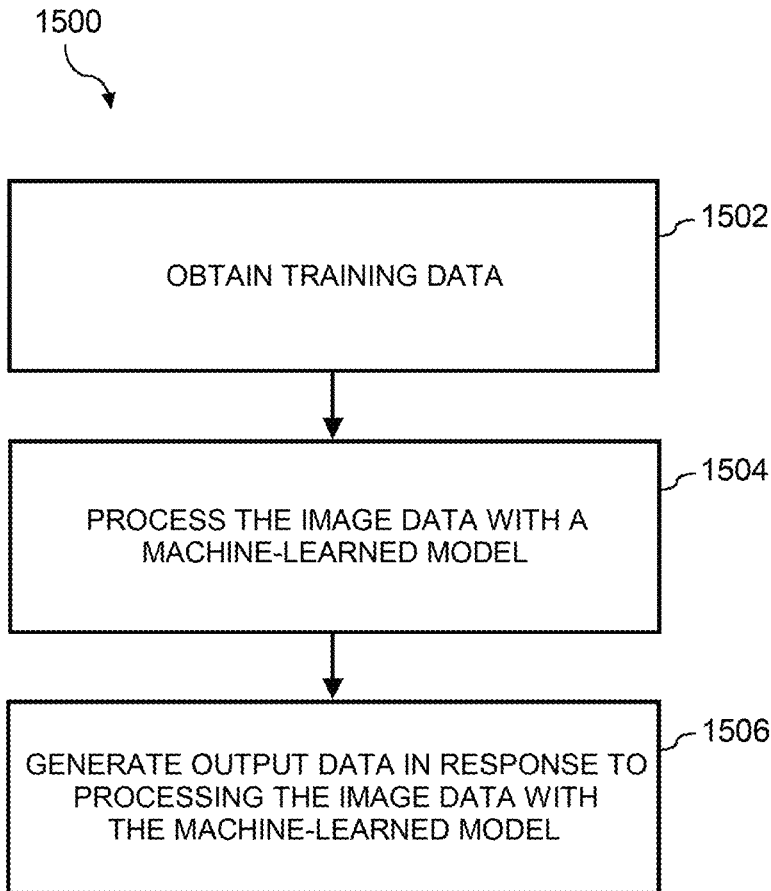
FIG. 15 depicts a flow chart diagram of an example method to perform object detection and classification according to example embodiments of the present disclosure.

FIG. 15 depicts a flow chart diagram of an example method to perform according to example embodiments of the present disclosure. Although FIG. 15 depicts steps performed in a particular order for purposes of illustration and discussion, the methods of the present disclosure are not limited to the particularly illustrated order or arrangement. The various steps of the method 1500 can be omitted, rearranged, combined, and/or adapted in various ways without deviating from the scope of the present disclosure.

At 1502, a computing system can obtain image data. The image data can include one or more images. The one or more images can be descriptive of one or more objects in an environment. The environment may include an office, a living room, a forest, a desert, a city, a lake, a parking lot, etc. The one or more objects may be depicted in less than a sixth of the image. The one or more objects can include a particular motor vehicle, a particular projectile, a particular product, a particular landmark, a particular region specific geographic feature, a particular building, etc. The image data may be obtained from a live camera feed, a server computing system, and/or local storage. The image data may be generated with a surveillance computing device, a mobile computing device, and/or one or more other image capture devices.

At 1504, the computing system can process the image data with a machine-learned model. The machine-learned model can include a backbone block, a neck block, a head block, and a prediction block. The machine-learned model can include an object detection model that is trained to process input images and output bounding boxes and classification labels for detected objects in the input images.

The backbone block can process an input image to perform one or more atrous convolutions. The backbone block can include a plurality of convolutional blocks. The plurality of convolutional blocks can include one or more atrous convolutional blocks. In some implementations, the backbone block can include a plurality of atrous convolutional blocks. One or more first atrous convolutional blocks and one or more second atrous convolutional blocks may skip a different number of pixels (e.g., the first atrous convolutional block(s) may skip one pixel, while the second atrous convolutional block(s) skip three pixels). In some implementations, the backbone block can include atrous downsampling, atrous upsampling, self-attention, and/or coordinate convolution.

The neck block can obtain a plurality of backbone outputs associated with a plurality of backbone outputs from a plurality of backbone layers. The neck block can process the plurality of backbone outputs to generate a plurality of feature maps. The neck block can include a bi-directional feature pyramid network. In some implementations, the neck block can include one or more residual blocks, one or more lambda blocks, one or more atrous downsampling blocks, and/or one or more atrous upsampling blocks. The neck block may be configured to concatenate convolutional outputs from different levels of the backbone block.

The head block can process the plurality of feature maps to generate prediction data. The head block can include one or more atrous upsample blocks, one or more atrous downsample blocks, and a plurality of fusion blocks. The head block may include adaptive spatial feature fusion and/or pointwise convolution.

The prediction block can process the prediction data to generate one or more prediction outputs associated with a detection of the one or more objects. The prediction block may include one or more activation blocks, one or more normalization blocks, and/or one or more smoothing blocks. In some implementations, the prediction block can include probability evaluation, ranking, and/or selection. The prediction block can include data segmentation, data augmentation, and/or data generation.

In some implementations, the machine-learned model can include a plurality of convolutional blocks, one or more bottleneck blocks, one or more self-attention blocks, and one or more normalization blocks.

At 1506, the computing system can generate an output data in response to processing the image data with the machine-learned model. The output data can include one or more bounding boxes and one or more object classifications. The one or more bounding boxes can be associated with one or more locations for the one or more objects. The one or more object classifications can be descriptive of one or more classifications of the one or more objects. In some implementations, generating the output data can include generating an annotated image that is descriptive of the one or more images annotated with the one or more bounding boxes and the one or more object classifications.

Figure 16:
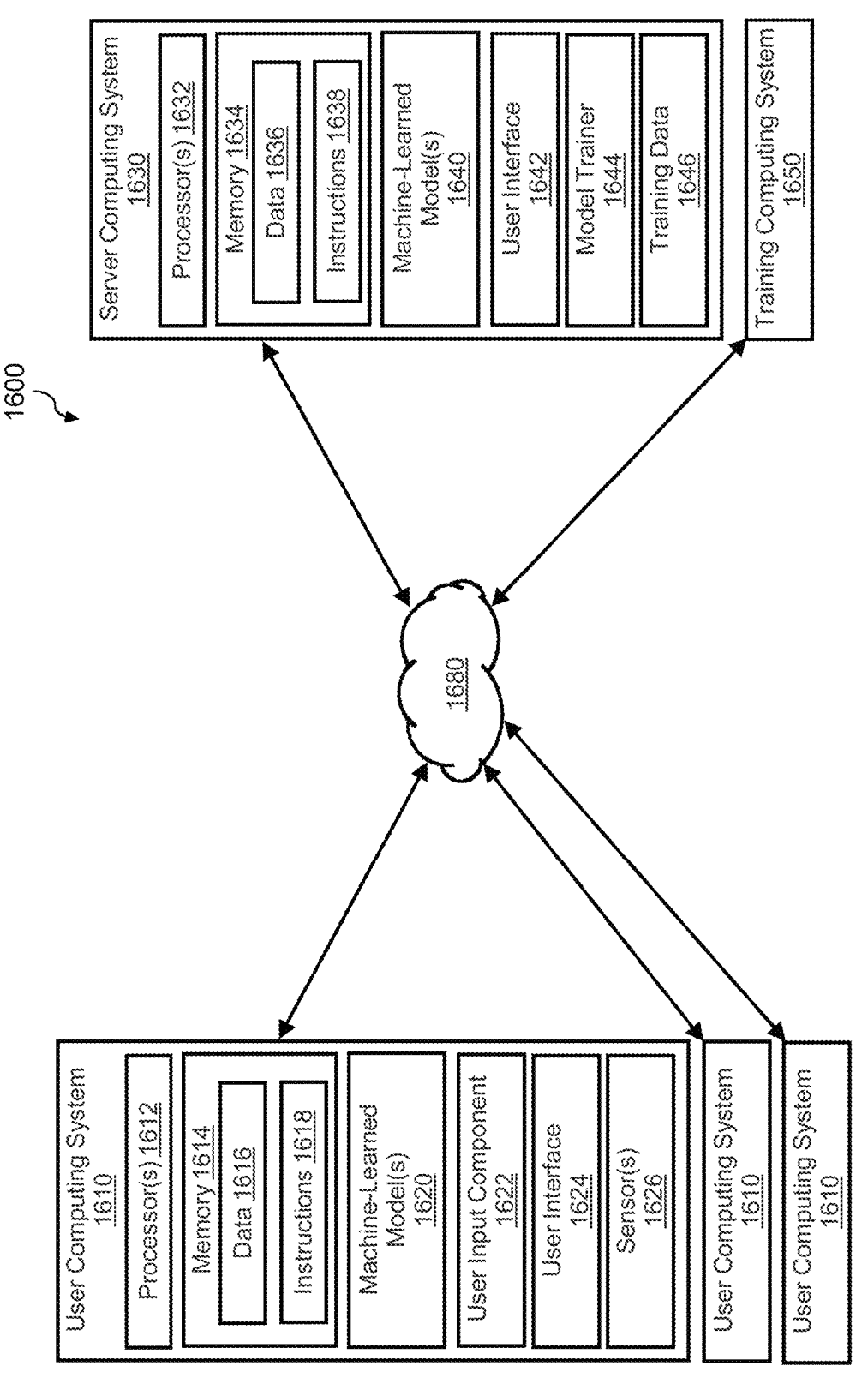
FIG. 16 depicts a block diagram of an example computing system that performs object detection according to example embodiments of the present disclosure.

FIG. 16 depicts a block diagram of an example computing system 1600 that performs object detection according to example embodiments of the present disclosure. The computing system 1600 can include a plurality of computing systems that communicate over a network 1680. The computing system 1600 can include one or more user computing systems 1610, one or more server computing systems 1630, and/or one or more training computing systems 1650.

The user computing system 1610 can include one or more computing devices. The computing devices can include a mobile computing device (e.g., a smartphone or tablet), a laptop computing device, a desktop computing device, a wearable computing device (e.g., a smart watch, a smart jacket, smart glasses, smart backpacks, etc.), a smart appliance (e.g., a smart thermostat, a smart refrigerator, a smart washing machine, a smart dryer, etc.), an embedded computing device, a surveillance computing device (e.g., a drone), or any other type of computing device.

The user computing system 1610 can include one or more processors 1612 that can be utilized to perform one or more operations. The one or more processors 1612 can include any suitable processing device (e.g., a processor core, a microprocessor, an ASIC, a FPGA, a controller, a microcontroller, etc.) and can be one processor or a plurality of processors that are operatively connected. The one or more processors 1612 can perform operations in series and/or in parallel. The one or more processors 1612 may be dedicated to a particular computing device and/or may be utilized by a plurality of devices to perform processing tasks.

The user computing system 1610 may include memory 1614 that can store data 1616 and/or instructions 1618. The memory 1614 can include one or more non-transitory computer-readable storage mediums, such as RAM, ROM, EEPROM, EPROM, flash memory devices, magnetic disks, etc., and combinations thereof. The data 1616 can include user data, application data, operating system data, etc. The data 1616 can include text data, image data, audio data, statistical data, latent encoding data, etc. The instructions 1618 can include instructions that when executed by the one or more processors 1612 cause the user computing device 1610 to perform operations.

In some implementations, the user computing system 1610 can store and utilize one or more machine-learned models 1620. The one or more machine-learned models 1620 can include the object detection model. The one or more machine-learned models 1620 can include a detection model, a natural language processing model, a segmentation model, a classification model, an augmentation model, a generative model, a discriminative model, and/or one or more other model types. In some implementations, the one or more machine-learned models 1620 can include various machine-learned models such as neural networks (e.g., deep neural networks) or other types of machine-learned models, including non-linear models and/or linear models. Neural networks can include convolutional neural networks, feed-forward neural networks, recurrent neural networks (e.g., long short-term memory recurrent neural networks), or other forms of neural networks. The one or more machine-learned models 1620 may include one or more transformer models.

The user computing system 1610 can include one or more user input components 1622, one or more user interfaces 1624, and/or one or more sensors 1626. The one or more user input components 1622 can be configured to receive user inputs and/or environmental inputs. For example, the one or more user input components 1622 can include a touch-sensitive component (e.g., a touch-sensitive display or a touch pad) that is sensitive to the touch of a user input object (e.g., a finger or a stylus). The touch-sensitive component can serve to implement a virtual keyboard. Other example user input components include a computer mouse, a remote, a controller, a microphone, a traditional keyboard, or other means by which a user can provide user input. In some implementations, the one or more user input components 1622 can include one or more gesture processing engines to determine touch gestures, audio gestures, and/or body gestures. The one or more user interfaces 1624 can be configured to obtain and/or display data. The one or more user interfaces 1624 can be associated with an operating system, one or more applications, one or more web platforms, and/or one or more devices. The one or more sensors 1626 can include one or more image sensors, one or more infrared sensors, one or more light detection and ranging (lidar) sensors, one or more audio sensors, one or more touch sensors, one or more sonic navigation and ranging (sonar) sensor, and/or one or more heat sensors.

The user computing system 1610 can be communicatively connected with the server computing system 1630 and/or the training computing system 1650 via the network 1680, which can include the internet (e.g., ethernet and/or WiFi), Bluetooth, and/or direct wiring.

The server computing system 1630 can be local and/or remote. The server computing system 1630 can include one or more servers, one or more modems, one or more desktops, one or more computing devices, and/or one or more decentralized systems.

The server computing system 1630 can include one or more processors 1632 that can be utilized to perform one or more operations. The one or more processors 1632 can include any suitable processing device (e.g., a processor core, a microprocessor, an ASIC, a FPGA, a controller, a microcontroller, etc.) and can be one processor or a plurality of processors that are operatively connected. The one or more processors 1632 can perform operations in series and/or in parallel. The one or more processors 1632 may be dedicated to a particular computing device and/or may be utilized by a plurality of devices to perform processing tasks.

The server computing system 1630 may include memory 1634 that can store data 1636 and/or instructions 1638. The memory 1634 can include one or more non-transitory computer-readable storage mediums, such as RAM, ROM, EEPROM, EPROM, flash memory devices, magnetic disks, etc., and combinations thereof. The data 1636 can include user data, application data, operating system data, etc. The data 1636 can include text data, image data, audio data, statistical data, latent encoding data, etc. The instructions 1638 can include instructions that when executed by the one or more processors 1632 cause the user computing device 1630 to perform operations.

In some implementations, the server computing system 1630 can store and utilize one or more machine-learned models 1640. The one or more machine-learned models 1640 can include the object detection model. The one or more machine-learned models 1640 can include a detection model, a natural language processing model, a segmentation model, a classification model, an augmentation model, a generative model, a discriminative model, and/or one or more other model types. In some implementations, the one or more machine-learned models 1640 can include various machine-learned models such as neural networks (e.g., deep neural networks) or other types of machine-learned models, including non-linear models and/or linear models. Neural networks can include convolutional neural networks, feed-forward neural networks, recurrent neural networks (e.g., long short-term memory recurrent neural networks), or other forms of neural networks. The one or more machine-learned models 1640 may include one or more transformer models.

In some implementations, the server computing system 1630 can include one or more user interfaces 1642, one or more model trainers 1644, and one or more training datasets 1646. The one or more user interfaces 1642 can be configured to obtain and/or display data. The one or more user interfaces 1642 can be associated with an operating system, one or more applications, one or more web platforms, and/or one or more devices. The one or more user interfaces 1642 of the server computing system 1630 may be communicatively connected with the one or more user interfaces 1624 of the user computing system 1610. The one or more model trainers 1644 can be configured to train the one or more machine-learned models 1640. In some implementations, the one or more machine-learned models 1620 of the user computing system may have been trained with the model trainer 1644. The model trainer 1644 can train the one or more machine-learned models 1640 with the one or more training datasets 1646. The training data 1646 can include image data, text data, latent encoding data, label data, bounding box data, ground truth data, user input data, objectness data, classification data, and/or other training data. Training can include one or more loss functions, one or more teacher models, one or more gating functions, and/or one or more transfer learning techniques.

In some implementations, a training computing system 1650 can be utilized to train the one or more machine-learned models 1620 of the user computing system 1610 and/or the one or more machine-learned models 1640 of the server computing system 1630. The training computing system 1650 can be local and/or remote. The training computing system 1650 can include one or more servers, one or more modems, one or more desktops, one or more computing devices, and/or one or more decentralized systems.

The training computing system 1650 can include one or more processors that can be utilized to perform one or more operations. The one or more processors can include any suitable processing device (e.g., a processor core, a microprocessor, an ASIC, a FPGA, a controller, a microcontroller, etc.) and can be one processor or a plurality of processors that are operatively connected. The one or more processors can perform operations in series and/or in parallel. The one or more processors may be dedicated to a particular computing device and/or may be utilized by a plurality of devices to perform processing tasks.

The training computing system 1650 may include memory that can store data and/or instructions. The memory can include one or more non-transitory computer-readable storage mediums, such as RAM, ROM, EEPROM, EPROM, flash memory devices, magnetic disks, etc., and combinations thereof. The data can include user data, application data, operating system data, etc. The data can include text data, image data, audio data, statistical data, latent encoding data, etc. The instructions can include instructions that when executed by the one or more processors cause the user computing device to perform operations.

In some implementations, the training computing system 1650 can store and utilize one or more machine-learned models. The one or more machine-learned models can include the object detection model. The one or more machine-learned models can include a detection model, a natural language processing model, a segmentation model, a classification model, an augmentation model, a generative model, a discriminative model, and/or one or more other model types. In some implementations, the one or more machine-learned models can include various machine-learned models such as neural networks (e.g., deep neural networks) or other types of machine-learned models, including non-linear models and/or linear models. Neural networks can include convolutional neural networks, feed-forward neural networks, recurrent neural networks (e.g., long short-term memory recurrent neural networks), or other forms of neural networks. The one or more machine-learned models may include one or more transformer models.

In some implementations, the training computing system 1650 can include one or more user interfaces, one or more model trainers, and one or more training datasets. The one or more user interfaces can be configured to obtain and/or display data. The one or more user interfaces can be associated with an operating system, one or more applications, one or more web platforms, and/or one or more devices. The one or more user interfaces of the training computing system 1650 may be communicatively connected with the one or more user interfaces 1624 of the user computing system 1610. The one or more model trainers can be configured to train the one or more machine-learned models. In some implementations, the one or more machine-learned models 1620 of the user computing system and/or the one or more machine-learned models 1640 of the server computing system 1630 may have been trained with the model trainer. The model trainer can train the one or more machine-learned models with the one or more training datasets. The training data can include image data, text data, latent encoding data, label data, bounding box data, ground truth data, user input data, objectness data, classification data, and/or other training data. Training can include one or more loss functions, one or more teacher models, one or more gating functions, and/or one or more transfer learning techniques.

The network 1680 can include any type of communications network (e.g., a local area network (e.g., intranet), wide area network (e.g., Internet), or some combination thereof) and can include any number of wired or wireless links. Communication over the network 1680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 1600 can be utilized to implement the systems and methods disclosed herein. Other computing systems including other system configurations may be utilized to implement the systems and methods disclosed herein.

Figure 17:
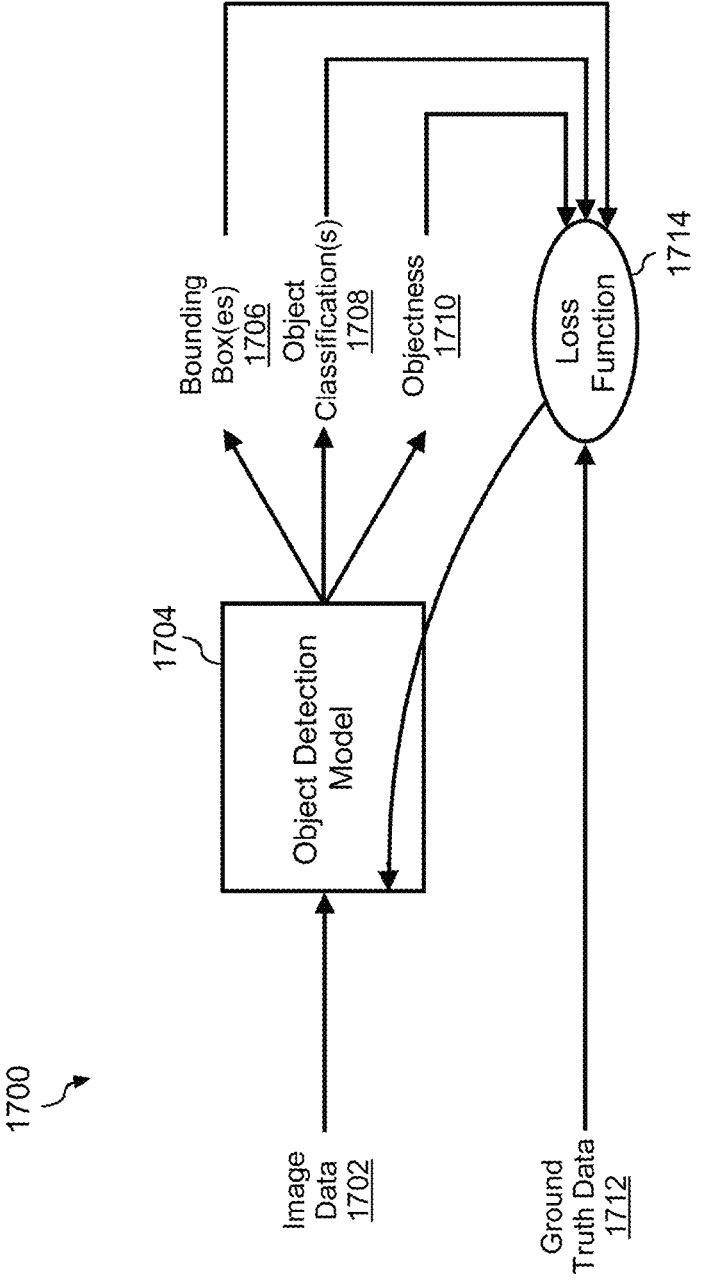
FIG. 17 depicts a block diagram of an example object detection model training according to example embodiments of the present disclosure.

FIG. 17 depicts a block diagram of an example object detection model training 1700 according to example embodiments of the present disclosure. In particular, the object detection model training 1700 can include ground truth training. The object detection model training 1700 can include obtaining training data. The training data can include image data 1702 and ground truth data 1712. The image data 1702 can be descriptive of one or more images that include one or more objects. The ground truth data 1712 can include one or more ground truth bounding boxes, one or more ground truth classification labels, and/or one or more ground truth objectness labels. The one or more ground truth bounding boxes can be descriptive of positions in the one or more images that include objects. The one or more ground truth classification labels can be descriptive of the identity of the objects. The one or more ground truth objectness labels can be descriptive of whether an object is present in a given portion of the one or more images.

The image data 1702 can be processed with the object detection model 1704 to generate one or more predicted bounding boxes 1706, one or more predicted object classifications 1708, and one or more objectness predictions 1710. One or more loss functions 1714 can then be evaluated by comparing the object detection model 1704 predictions to the ground truth data 1712. For example, a first loss function may be evaluated by comparing the one or more predicted bounding boxes 1706 to the one or more ground truth bounding boxes. A second loss function may be evaluated by comparing the one or more predicted object classifications 1708 to the one or more ground truth classification labels. A third loss function may be evaluated by comparing the one or more objectness predictions 1710 to the one or more ground truth objectness labels. The loss functions 1714 may be separate or may be a part of a larger loss function. The loss function(s) 1714 may be evaluated to generate one or more gradient descents that can then be backpropagated to the object detection model 1704 to adjust one or more parameters of the object detection model 1704.

The systems and methods disclosed herein can include a one-shot automated target recognition (ATR) architecture for deep-learning object detectors. The systems and methods can be specifically designed to maximize the accuracy of finding small targets (<32 pixels), while minimizing the number of model parameters. In some examples, at just 6.5 million parameters, the systems and methods can outperform models with 47 million parameters at all size scales except large objects (>96 pixels).

Systems and methods for object detection and recognition (and/or ATR) can include deep-learning (which can include one or more convolutional neural networks, or "CNN") architectures. Open-source object detectors from pre-existing systems may suffer from two fundamental weaknesses that can severely impact their use for ATR needs. Existing open-source CNN-based ATR architectures may seek networks as streamlined as possible, since each function and parameter slows down processing time. As such, their performance on common datasets may suffer dramatically on small objects, with mean average precision (mAP) of small targets.

Deep-learning can utilize a lengthy series of sequential and parallel convolution kernels that can approximate mathematical operations on discrete data. When combined with simple non-linear "activation" functions (e.g., the Rectified Linear Unit or ReLU, for which output=input if input>0, or else 0), the networks can reproduce complex logical expressions. Given a "deep" enough network (e.g., many layers of convolutions and activations configured by millions of parameters) and sufficient training data, the network can "learn" a feature space and prediction model without a prior user intervention.

In some implementations, object detection models may be trained and tested on the COCO (Common Objects in Context, cocodataset.org) dataset, including over 123,000 images with almost 900,000 labeled objects in 80 different categories (e.g., cats, people, and cars). The trained models can be retrained with new images of relevant targets. The "transfer learning" can leverage that during training on the original training dataset), the model may learn a set of features and logic for detection and classification. The learned features and logic can serve as initial starting points for any new data with the retraining adjusting a set of the model's parameters. The more parameters in a model, the larger the new dataset that may be utilized to obtain accurate results and to mitigate overfitting. The systems and methods disclosed herein can learn to detect and classify unique objects on a small set of data (e.g., hundreds of unique views of objects and scenes, rather than tens or hundreds of thousands).

The systems and methods disclosed herein can utilize techniques across disparate fields of CNN-based deep learning to enlarge receptive fields and maximize semantic information exchange. The results can include more information being encoded for targets and with fewer parameters. On the training side, the systems and methods can utilize data augmentation and specialized loss functions, to focus performance on the smallest, rarest, and most challenging targets. The result can include a plurality of model configurations (e.g., multiple models that use, in some examples, about 6.5 million parameters or less). The "Peregrine" model can be a fast and efficient model for object detection, with memory and speed comparable to YOLOv5s (Ultralytics, "YOLOv5," PYTORCH (Nov. 22, 2022), https://pytorch.org/hub/ultralytics_yolov5/.), while "Kestrel" may be smaller, with memory and speed comparable to YOLOv5L.

The below quantitative comparison of detection and classification of the YOLOv5s and v5L models can be compared to the Peregrine and Kestrel models, on a hold-out set of 5,000 COCO images, containing almost 37,000 objects. With only 6.5 million parameters, the example Peregrine mAP can be consistently higher than YOLOv5s by 8-10% of mAP at all size scales. The example Kestrel mAP can be consistent, if not higher than, YOLOv5L, which uses 41 million more parameters. In particular, Kestrel may outperform YOLOv5L by 7% of mAP for tiny and small targets.

TABLE 1(a)

| Train Data | Test Data |
| --- | --- |
| 108,288 | COCO |

TABLE 1(a)-continued

| Train Data | Test Data |
| --- | --- |
| COCO 2017 3-color images | 2017 Val 5000 3-color images |

TABLE 1(b)

| Name | Model Parameters | Utilization | Relative framerate | Classes |
| --- | --- | --- | --- | --- |
| YOLOv5s | 7,459,580 | 460 Mb | 100 | 80 |
| YOLOv5L | 47,818,749 | 1,475 Mb | 31 | 80 |
| Peregrine | 6,547,212 | 470 Mb | 63 | 80 |
| Kestrel | 6,547,052 | 1,541 Mb | 20 | 80 |

TABLE 1(c)

| Model Name | mAP@50 All | Tiny | Small | Medium | Large |
| --- | --- | --- | --- | --- | --- |
| YOLOv5s | 52 | 24.7 | 31.9 | 58.7 | 62.4 |
| YOLOv5L | 62.3 | 35.3 | 42.9 | 68.8 | 73.7 |
| Peregrine | 59.3 | 32.7 | 39.2 | 65.5 | 72.2 |
| Kestrel | 63.5 | 42.6 | 49.3 | 69.4 | 70.1 |

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:
1. A computing system for object detection, the system comprising:
  one or more processors; and
  one or more non-transitory computer-readable media that collectively store instructions that, when executed by the one or more processors, cause the computing system to perform operations, the operations comprising:

obtaining image data, wherein the image data comprises one or more images, wherein the one or more images are descriptive of one or more objects in an environment;

processing image data with an object detection model to generate one or more bounding boxes and one or more object classifications, wherein the object detection model was trained to detect and classify objects in an input image, wherein processing the image data with the object detection model to generate the one or more bounding boxes and the one or more object classifications comprises:

performing a first atrous convolution on the one or more images with a first convolutional block to generate a first convolution output, wherein the first atrous convolution comprises convolution kernels that are spaced one or more pixels apart;

performing a second atrous convolution on the one or more images with a second convolutional block to generate a second convolution output;

generating one or more feature maps based on the first convolution output and the second convolution output, wherein the one or more feature maps are descriptive of a plurality of features in the one or more images;

performing spatial pooling on the one or more feature maps to generate a three-dimensional tensor representation;

processing the three-dimensional tensor representation with a prediction block to generate the one or more bounding boxes and one or more object classifications;

wherein the object detection model comprises a plurality of bottlenecks, wherein adaptive attention is performed at the end of each bottleneck to increase semantic information capture across each feature layer, and wherein the object detection model was trained based on a combined loss function comprising a standard focal loss for objects, a class-balanced focal loss, object label soothing, a bounding box loss, and a balanced object loss; and providing the one or more bounding boxes and the one or more object classifications as output.

2. The system of claim 1, wherein the operations further comprise:

processing the first convolution output and the second convolution output with an attention block to generate an attention output, wherein the attention block maintains semantic information across processing blocks.

3. The system of claim 1, wherein generating one or more feature maps based on the first convolution output and the second convolution output comprises:

processing the one or more images with a third convolutional block to generate a third convolution output, wherein the third convolution output is descriptive of one or more kernels generated without a pixel skip.

4. The system of claim 3, wherein generating one or more feature maps based on the first convolution output and the second convolution output comprises:

generating a fused feature map based at least in part on combining the first convolution output, the second convolution output, and the third convolution output.

5. The system of claim 4, wherein the first convolution output, the second convolution output, and the third convolution output are combined via a learned weighted sum and pointwise convolution to generate a single output feature map.

6. The system of claim 4, wherein each of the first convolution output, the second convolution output, and the third convolution output comprise a different receptive-field size.

7. The system of claim 1, wherein generating one or more feature maps based on the first convolution output and the second convolution output comprises:

generating a plurality of feature maps;

wherein processing the image data with the object detection model to generate the one or more bounding boxes and the one or more object classifications further comprises:

processing the plurality of feature maps with a fusion block to spatially filter information.

8. The system of claim 1, wherein processing the image data with the object detection model to generate the one or more bounding boxes and the one or more object classifications comprises:

processing feature data with a lambda block, wherein the lambda block is configured to generate contextual representations for prediction.

9. The system of claim 1, wherein processing the image data with the object detection model to generate the one or more bounding boxes and the one or more object classifications comprises:

processing the second convolution output with an atrous upsample block to generate an upsampled output.

10. The system of claim 9, wherein processing the image data with the object detection model to generate the one or more bounding boxes and the one or more object classifications comprises:

concatenating the upsampled output and the first convolution output to generate a concatenated upsampled dataset;

processing the concatenated upsampled dataset with an atrous downsampling block to generate a downsampled dataset; and generating a feature map based on a concatenation of the second convolution output and the downsampled dataset.

11. A computer-implemented method for training an object detection model, the method comprising:

obtaining, by a computing system comprising one or more processors, training data, wherein the training data comprises image data, one or more ground truth bounding boxes, and one or more ground truth object classifications, wherein the image data comprises one or more images, wherein the one or more images are descriptive of one or more objects in an environment, wherein the one or more ground truth bounding boxes are descriptive of a location for the one or more objects, and wherein the one or more ground truth object classifications are descriptive of an object type for each of the one or more objects;

processing, by the computing system, the image data with the object detection model to generate one or more predicted bounding boxes and one or more predicted classifications, wherein the object detection model comprises a plurality of atrous convolution blocks that process the one or more images to generate kernels by skipping pixels during processing, wherein the kernels are processed to generate a plurality of feature maps that are then processed to generate prediction data, wherein the prediction data is processed to generate the one or more predicted bounding boxes and the one or more predicted classifications, wherein the object detection model comprises a plurality of bottlenecks, wherein adaptive attention is performed at the end of each bottleneck to increase semantic information capture across each feature layer;

evaluating, by the computing system, a combined loss function based on a standard focal loss for objects, a class-balanced focal loss, object label soothing, a bounding box loss, and a balanced object loss, wherein evaluating the combined loss function comprises:

evaluating, by the computing system, a first loss function that evaluates a difference between the one or more predicted bounding boxes and the one or more ground truth bounding boxes;

evaluating, by the computing system, a second loss function that evaluates a difference between the one or more predicted classifications and the one or more ground truth object classifications; and adjusting, by the computing system, one or more parameters of the object detection model based at least in part on the combined loss function.

12. The method of claim 11, wherein processing the image data with the object detection model comprises:

generating, by the computing system, an objectness output, wherein the objectness output is descriptive of a presence prediction, wherein the presence prediction is descriptive of whether one or more portions of the one or more images are descriptive of one or more objects.

13. The method of claim 12, wherein evaluating the combined loss function further comprises:

evaluating, by the computing system, a third loss function that evaluates the objectness output.

14. The method of claim 11, wherein the object detection model comprises atrous upsampling and atrous downsampling.

15. The method of claim 14, wherein feature data processed with the atrous upsampling is concatenated with upstream feature data then processed with the atrous downsampling.

16. One or more non-transitory computer-readable media that collectively store instructions that, when executed by one or more computing devices, cause the one or more computing devices to perform operations, the operations comprising:

obtaining image data, wherein the image data comprises one or more images, wherein the one or more images are descriptive of one or more objects in an environment;

processing the image data with a machine-learned model, wherein the machine-learned model comprises:

a backbone block, wherein the backbone block processes an input image to perform one or more atrous convolutions;

a neck block, wherein the neck block obtains a plurality of backbone outputs associated with a plurality of backbone outputs from a plurality of backbone layers, wherein the neck block processes the plurality of backbone outputs to generate a plurality of feature maps;

a head block, wherein the head block processes the plurality of feature maps to generate prediction data; and a prediction block, wherein the prediction block processes the prediction data to generate one or more prediction outputs associated with a detection of the one or more objects;

wherein the machine-learned model comprises a plurality of bottlenecks, wherein adaptive attention is performed at the end of each bottleneck to increase semantic information capture across each feature layer, and wherein the machine-learned model was trained based on a combined loss function comprising a standard focal loss for objects, a class-balanced focal loss, object label soothing, a bounding box loss, and a balanced object loss; and in response to processing the image data with the machine-learned model, generating an output data, wherein the output data comprises one or more bounding boxes and one or more object classifications, wherein the one or more bounding boxes are associated with one or more locations for the one or more objects, and wherein the one or more object classifications are descriptive of one or more classifications of the one or more objects.

17. The one or more non-transitory computer-readable media of claim 16, wherein the head block comprises:

one or more atrous upsample blocks;

one or more atrous downsample blocks; and a plurality of fusion blocks.

18. The one or more non-transitory computer-readable media of claim 16, wherein the machine-learned model comprises:

a plurality of convolutional blocks;

one or more self-attention blocks; and one or more normalization blocks.

19. The one or more non-transitory computer-readable media of claim 16, wherein generating the output data comprises:

generating an annotated image that is descriptive of the one or more images annotated with the one or more bounding boxes and the one or more object classifications.

* * * * *